(12) United States Patent
Hashimoto et al.

(10) Patent No.: US 11,852,244 B2
(45) Date of Patent: Dec. 26, 2023

(54) SLIDING COMPONENT AND METHOD OF MANUFACTURING SLIDING MEMBER

(71) Applicant: Eagle Industry Co., Ltd., Tokyo (JP)

(72) Inventors: Hiroyuki Hashimoto, Tokyo (JP); Yoshiaki Takigahira, Tokyo (JP)

(73) Assignee: EAGLE INDUSTRY CO., LTD.

( * ) Notice: Subject to any disclaimer, the term of this patent is extended or adjusted under 35 U.S.C. 154(b) by 14 days.

(21) Appl. No.: 17/424,847

(22) PCT Filed: Jan. 31, 2020

(86) PCT No.: PCT/JP2020/003641
§ 371 (c)(1),
(2) Date: Jul. 21, 2021

(87) PCT Pub. No.: WO2020/162347
PCT Pub. Date: Aug. 13, 2020

(65) Prior Publication Data
US 2022/0090683 A1    Mar. 24, 2022

(30) Foreign Application Priority Data

Feb. 4, 2019 (JP) ................................ 2019-018307

(51) Int. Cl.
*F16J 15/34* (2006.01)
(52) U.S. Cl.
CPC ................ *F16J 15/3412* (2013.01)
(58) Field of Classification Search
CPC ... F16J 15/3404; F16J 15/3408; F16J 15/3412
See application file for complete search history.

(56) References Cited

U.S. PATENT DOCUMENTS

| | | | |
|---|---|---|---|
| 3,383,116 A | 5/1968 | Carter | ............................ 277/96 |
| 3,527,465 A | 9/1970 | Guinard | |
| 3,675,935 A | 7/1972 | Ludwig | ................. F16J 15/342 |
| 3,704,019 A | 11/1972 | McHugh | ....................... 277/400 |

(Continued)

FOREIGN PATENT DOCUMENTS

| | | | |
|---|---|---|---|
| CN | 1245552 | 2/2000 | .............. F16J 15/34 |
| CN | 2460801 | 11/2001 | .............. F16J 15/40 |

(Continued)

OTHER PUBLICATIONS

A Second Office Action dated Jul. 25, 2016 by the State Intellectual Property Office of China counterpart application No. 201380029125.0.

(Continued)

*Primary Examiner* — Gilbert Y Lee
(74) *Attorney, Agent, or Firm* — HAYES SOLOWAY P.C.

(57) ABSTRACT

A sliding component includes at least one of a pair of sliding members and provided with: a group of recessed portions including a plurality of recessed portions formed in a sliding surface of the sliding member; and a plurality of hollow portions formed inside the sliding member and out of alignment with the recessed portions in a thickness direction of the sliding member. The sliding member is further provided with the hollow portions disposed so as to generate at least part of a new group of recessed portions until the sliding member is worn by the thickness of deepest one of the recessed portions.

20 Claims, 15 Drawing Sheets

(56) References Cited

U.S. PATENT DOCUMENTS

| | | | |
|---|---|---|---|
| 3,782,737 A | 1/1974 | Ludwig et al. | 277/27 |
| 4,056,478 A | 11/1977 | Capelli | C01M 5/00 |
| 4,071,253 A | 1/1978 | Heinen et al. | 277/3 |
| 4,523,764 A | 6/1985 | Albers et al. | 277/3 |
| 4,889,348 A | 12/1989 | Amundson | 277/306 |
| 5,071,141 A | 12/1991 | Lai et al. | |
| 5,092,612 A | 3/1992 | Victor et al. | 277/96.1 |
| 5,174,584 A | 12/1992 | Lahrman | 277/400 |
| 5,180,173 A | 1/1993 | Kimura et al. | |
| 5,224,714 A | 7/1993 | Kimura | 277/400 |
| 5,447,316 A | 9/1995 | Matsui | 277/400 |
| 5,556,111 A | 9/1996 | Sedy | 277/400 |
| 5,558,341 A | 9/1996 | McNickle | 277/400 |
| 5,769,604 A | 6/1998 | Gardner et al. | 415/170.1 |
| 5,834,094 A | 11/1998 | Etsion et al. | 428/156 |
| 5,947,481 A | 9/1999 | Young | 277/400 |
| 5,952,080 A | 9/1999 | Etsion et al. | 428/156 |
| 6,002,100 A | 12/1999 | Etsion | 219/121.71 |
| 6,046,430 A | 4/2000 | Etsion | 219/121.71 |
| 6,135,458 A | 10/2000 | Fuse | 277/401 |
| 6,152,452 A | 11/2000 | Wang | 277/400 |
| 6,213,473 B1 | 4/2001 | Lebeck | |
| 6,446,976 B1 | 9/2002 | Key et al. | F16J 15/34 |
| 6,692,006 B2 | 2/2004 | Holder | 277/346 |
| 6,726,213 B2 | 4/2004 | Wang | 277/400 |
| 7,258,346 B2 | 8/2007 | Tejima | 277/399 |
| 7,377,518 B2 | 5/2008 | Lai | 277/400 |
| 7,758,051 B2 | 7/2010 | Roberts-Haritonov | 277/401 |
| 7,931,277 B2 | 4/2011 | Garrison | 277/399 |
| 8,100,405 B2 | 1/2012 | Kneeland et al. | 277/355 |
| 8,342,534 B2 | 1/2013 | Vasagar | 277/399 |
| 8,585,060 B2 | 11/2013 | Oshii et al. | 277/401 |
| 9,151,390 B2 | 10/2015 | Hosoe | F16J 15/3412 |
| 9,169,931 B2 | 10/2015 | Tokunaga | F16J 15/34 |
| 9,228,660 B2 | 1/2016 | Hosoe | F16J 15/3412 |
| 9,353,867 B2 | 5/2016 | Itadani et al. | F16J 15/3448 |
| 9,494,239 B2 | 11/2016 | Hosoe | F16J 15/342 |
| 9,512,923 B2 | 12/2016 | Inoue et al. | F16J 15/34 |
| 9,574,667 B2 | 2/2017 | Takahashi et al. | F16J 15/342 |
| 9,772,037 B2* | 9/2017 | Itadani | F16J 15/3424 |
| 9,784,372 B2 | 10/2017 | Iguchi | F16J 15/342 |
| 9,863,473 B2 | 1/2018 | Hosoe et al. | F16C 33/741 |
| 9,958,010 B2 | 5/2018 | Itadani | F16C 33/74 |
| 9,982,715 B2 | 5/2018 | Gorges et al. | F16C 33/201 |
| 10,054,230 B2 | 8/2018 | Katori et al. | F16J 15/3412 |
| 10,132,411 B2 | 11/2018 | Hosoe et al. | F16J 15/164 |
| 10,337,620 B2 | 7/2019 | Tokunaga et al. | F16J 15/342 |
| 10,443,737 B2 | 10/2019 | Itadani | F16J 15/342 |
| 10,495,228 B2 | 12/2019 | Itadani | F16J 15/342 |
| 10,865,883 B2 | 12/2020 | Seki et al. | F16J 15/3404 |
| 11,248,706 B2 | 2/2022 | Imura | F16C 33/74 |
| 11,320,052 B2 | 5/2022 | Imura et al. | F16J 15/34 |
| 2002/0014743 A1 | 2/2002 | Zheng | 277/358 |
| 2002/0093141 A1 | 7/2002 | Wang | F16J 15/34 |
| 2002/0158416 A1 | 10/2002 | Hosanna | F16J 15/3404 |
| 2004/0080112 A1 | 4/2004 | Tejima | F16J 15/3436 |
| 2005/0212217 A1 | 9/2005 | Tejima | 277/399 |
| 2005/0263963 A1 | 12/2005 | Lai | 277/399 |
| 2007/0228664 A1 | 10/2007 | Anand | F16J 15/3496 |
| 2007/0267820 A1 | 11/2007 | Martin | F16J 15/3496 |
| 2007/0275267 A1 | 11/2007 | Sabouni | F16J 15/3496 |
| 2007/0296156 A1 | 12/2007 | Yanagisawa et al. | 277/352 |
| 2008/0100001 A1 | 5/2008 | Flaherty | |
| 2009/0200749 A1 | 8/2009 | Teshima | F16J 15/3484 |
| 2011/0215531 A1 | 9/2011 | Tokunaga et al. | 277/399 |
| 2011/0215535 A1 | 9/2011 | Vasagar | 277/559 |
| 2011/0305871 A1 | 12/2011 | Tabuchi | F16J 15/3284 |
| 2012/0018957 A1 | 1/2012 | Watanabe | F16J 15/34 |
| 2012/0217705 A1 | 8/2012 | Hosoe | 277/400 |
| 2013/0168928 A1 | 7/2013 | Schrufer | C10M 103/02 |
| 2013/0209011 A1 | 8/2013 | Tokunaga | |
| 2014/0159314 A1 | 6/2014 | Hosoe | F16J 15/34 |
| 2014/0197600 A1 | 7/2014 | Hosoe | F16J 15/342 |
| 2014/0217676 A1 | 8/2014 | Hosoe et al. | 277/350 |
| 2014/0319776 A1 | 10/2014 | Theike et al. | |
| 2015/0115540 A1 | 4/2015 | Tokunaga | F16J 15/34 |
| 2015/0123350 A1 | 5/2015 | Itadani | F16J 15/3412 |
| 2015/0167847 A1 | 6/2015 | Tokunaga | |
| 2015/0345642 A1 | 12/2015 | Haas | F16J 15/3496 |
| 2015/0377297 A1 | 12/2015 | Tokunaga et al. | F16C 33/748 |
| 2016/0033045 A1 | 2/2016 | Itadani et al. | F16J 15/3412 |
| 2016/0097457 A1 | 4/2016 | Sun et al. | F16J 15/3412 |
| 2017/0241549 A1 | 8/2017 | Itadani | F16J 15/3412 |
| 2017/0261107 A1 | 9/2017 | Martin | F16J 15/3452 |
| 2017/0350407 A1 | 12/2017 | Yamamoto et al. | F04D 29/046 |
| 2018/0017163 A1 | 1/2018 | Hosoe et al. | F16J 15/164 |
| 2018/0073394 A1 | 3/2018 | Tokunaga et al. | F01D 25/18 |
| 2018/0112711 A1 | 4/2018 | Itadani | F16J 15/363 |
| 2018/0128377 A1 | 5/2018 | Tukunaga et al. | F16J 15/342 |
| 2018/0128378 A1 | 5/2018 | Tokunaga et al. | F16J 15/342 |
| 2018/0135699 A1 | 5/2018 | Tokunaga et al. | F16C 33/80 |
| 2018/0172162 A1 | 6/2018 | Tokunaga et al. | F16J 15/34 |
| 2018/0195618 A1 | 7/2018 | Itadani et al. | F16J 15/3416 |
| 2018/0299015 A1 | 10/2018 | Itadani | F16J 15/3448 |
| 2019/0170257 A1 | 6/2019 | Hosoe et al. | F16J 15/3412 |
| 2019/0285115 A1 | 9/2019 | Negishi et al. | F16C 17/045 |
| 2019/0301522 A1 | 10/2019 | Negishi et al. | F16C 17/02 |
| 2019/0331162 A1 | 10/2019 | Negishi | F16J 15/34 |
| 2020/0224768 A1 | 7/2020 | Imura | F16J 15/3412 |
| 2020/0240470 A1 | 7/2020 | Sorgenti | F16J 15/3212 |
| 2020/0332901 A1 | 10/2020 | Imura | F16J 15/3412 |
| 2021/0041026 A1 | 2/2021 | Imura | F16J 15/3424 |
| 2021/0048062 A1 | 2/2021 | Masumi et al. | F16C 17/102 |
| 2021/0048106 A1 | 2/2021 | Imura et al. | F16J 15/3412 |
| 2021/0080009 A1 | 3/2021 | Kimura et al. | F16J 15/3412 |
| 2021/0116030 A1 | 4/2021 | Kimura et al. | F16J 15/182 |
| 2021/0364034 A1 | 11/2021 | Okada | F16J 15/342 |

FOREIGN PATENT DOCUMENTS

| | | | |
|---|---|---|---|
| CN | 1401924 | 3/2003 | F16J 15/16 |
| CN | 101644333 | 2/2010 | F16J 15/34 |
| CN | 101793169 | 8/2010 | F01D 11/08 |
| CN | 101793324 | 8/2010 | F16J 15/16 |
| CN | 101861485 | 10/2010 | F16J 15/34 |
| CN | 201496542 | 7/2013 | F16J 15/16 |
| CN | 203098871 | 7/2013 | F16J 15/34 |
| CN | 103557229 | 2/2014 | F16C 17/04 |
| CN | 103557334 | 2/2014 | F16J 15/34 |
| CN | 203641506 | 6/2014 | F16J 15/16 |
| CN | 104169622 | 11/2014 | F16J 15/34 |
| CN | 104321568 | 1/2015 | F16C 33/72 |
| CN | 104685273 | 6/2015 | F16J 15/34 |
| CN | 106029294 | 10/2016 | B23K 26/364 |
| CN | 205877184 | 1/2017 | F16J 15/16 |
| CN | 205877198 | 1/2017 | F16J 15/34 |
| CN | 106439023 | 2/2017 | F16J 15/16 |
| CN | 106763778 | 5/2017 | F16J 15/16 |
| CN | 107489770 | 12/2017 | F16J 15/34 |
| CN | 109237042 | 1/2019 | F16J 15/34 |
| CN | 110770456 | 2/2020 | F16C 33/12 |
| CN | 111656065 | 9/2020 | F16J 15/34 |
| DE | 3223703 | 6/1982 | F16J 15/34 |
| DE | 102008038396 | 2/2010 | |
| EP | 0369295 | 11/1988 | F16J 15/34 |
| EP | 0518681 | 12/1992 | G11B 15/60 |
| EP | 0637706 | 8/1993 | F16J 15/34 |
| EP | 2138225 | 12/2009 | B01J 13/20 |
| EP | 2754931 | 7/2014 | F16J 15/34 |
| EP | 3112078 | 1/2017 | B23K 26/364 |
| EP | 3196516 | 7/2017 | F16J 15/34 |
| EP | 3217049 | 9/2017 | F16J 15/34 |
| EP | 3396186 | 10/2018 | F16C 33/10 |
| EP | 3575621 | 12/2019 | F16C 33/10 |
| EP | 3575643 | 12/2019 | F16J 15/34 |
| EP | 3650722 | 5/2020 | F16C 33/12 |
| FR | 2342440 | 9/1997 | F16J 15/34 |
| GB | 1509482 | 5/1978 | F16C 33/10 |
| GB | 2263952 | 8/1993 | F16J 15/34 |
| JP | S51-034974 | 3/1976 | |
| JP | S52-143571 | 10/1977 | F16J 15/26 |
| JP | 57163770 | 10/1982 | F16J 15/3412 |
| JP | S59-195253 | 12/1984 | F16J 15/34 |
| JP | S59-195254 | 12/1984 | F16J 15/34 |

(56) References Cited

FOREIGN PATENT DOCUMENTS

| | | | |
|---|---|---|---|
| JP | S63-190975 | 8/1988 | ............... F16J 15/34 |
| JP | H02-236067 | 9/1990 | ............... F16J 15/34 |
| JP | H02-136863 | 11/1990 | ............... F16J 15/34 |
| JP | H04-50559 | 2/1992 | ............... F16J 15/34 |
| JP | H04-337165 | 11/1992 | ............... F16J 15/34 |
| JP | H05-60247 | 3/1993 | ............... F16J 15/34 |
| JP | H05-296248 | 11/1993 | |
| JP | H05-90049 | 12/1993 | ............... F16J 15/34 |
| JP | H06-17941 | 1/1994 | ............... F16J 15/34 |
| JP | H06-117547 | 4/1994 | ............... F16J 15/34 |
| JP | H06-174107 | 6/1994 | ............... F16J 15/34 |
| JP | H06-323442 | 11/1994 | ............... F16J 15/34 |
| JP | H06-105105 | 12/1994 | ............... F16J 15/34 |
| JP | 9-89119 | 3/1997 | ............... F16J 15/34 |
| JP | 9-292034 | 11/1997 | ............... F16J 15/34 |
| JP | H10-281299 | 10/1998 | ............... F16J 15/34 |
| JP | H10-292867 | 11/1998 | |
| JP | H11-287329 | 10/1999 | ............... F16J 15/34 |
| JP | 3066367 | 5/2000 | ............... F16J 15/34 |
| JP | 2001-12458 | 1/2001 | ............... F06C 17/10 |
| JP | 2003-343730 | 12/2003 | ............... F16J 15/22 |
| JP | 2005-180652 | 7/2005 | ............... F16J 15/34 |
| JP | 2005-315391 | 11/2005 | |
| JP | 2005-337503 | 12/2005 | ............... F16J 15/34 |
| JP | 2006-77899 | 3/2006 | ............... F16J 15/34 |
| JP | 2006-90524 | 4/2006 | ............... F16C 17/02 |
| JP | 2006-183702 | 7/2006 | ............... F16C 17/04 |
| JP | 2007-162045 | 6/2007 | |
| JP | 2008-106940 | 5/2008 | ............... F16J 15/34 |
| JP | 2011-74931 | 4/2011 | ............... F16J 15/34 |
| JP | 2011-185292 | 9/2011 | ............... F16J 15/34 |
| JP | 2012-2295 | 1/2012 | ............... F16J 15/34 |
| JP | 2012-062534 | 3/2012 | |
| JP | 2012-122135 | 6/2012 | ............... C25D 15/02 |
| JP | 2013-213545 | 10/2013 | ............... F16C 32/06 |
| JP | 2014-529052 | 10/2014 | |
| JP | 2015-063647 | 4/2015 | |
| JP | 2015-68330 | 4/2015 | ............... F04C 29/00 |
| JP | 5693599 | 4/2015 | |
| JP | 2016-80090 | 5/2016 | ............... F16J 15/34 |
| JP | 5960145 | 7/2016 | ............... F16J 15/34 |
| WO | WO 2006/051702 | 5/2006 | ............... F16J 15/34 |
| WO | WO 2011/115073 | 9/2011 | ............... F16J 15/34 |
| WO | WO 2012/046749 | 4/2012 | ............... F16J 15/34 |
| WO | WO 2013/035503 | 3/2013 | ............... F16J 15/34 |
| WO | WO2013053411 | 4/2013 | |
| WO | WO2014061544 | 4/2014 | |
| WO | WO2014148316 | 9/2014 | ............... F16J 15/34 |
| WO | WO2014148317 | 9/2014 | ............... F16J 15/34 |
| WO | WO 2014/174725 | 10/2014 | ............... F16J 15/34 |
| WO | WO2015111707 | 7/2015 | ............... F16J 15/18 |
| WO | WO2016035860 | 3/2016 | ............... F16J 15/34 |
| WO | WO 2016/167262 | 10/2016 | ............... F16J 15/34 |
| WO | WO 2016/186015 | 11/2016 | ............... F16J 15/34 |
| WO | WO 2016/186019 | 11/2016 | ............... F16J 15/34 |
| WO | WO 2016/186020 | 11/2016 | ............... F16J 15/34 |
| WO | WO 2016/203878 | 12/2016 | ............... F16J 15/34 |
| WO | WO 2017/002774 | 1/2017 | ............... F16J 15/34 |
| WO | WO 2017/061406 | 4/2017 | ............... F16J 15/34 |
| WO | WO 2018/092742 | 5/2018 | ............... F16J 15/34 |
| WO | WO 2018/105505 | 6/2018 | ............... F16J 33/12 |
| WO | WO2018/139231 | 8/2018 | ............... F16J 15/34 |

OTHER PUBLICATIONS

First Notification of Reason for Refusal with Search Report dated Sep. 25, 2015 by the State Intellectual Property Office of China for Chinese counterpart application No. 201380029125.0.
First Notification of Reason for Refusal with Search Report issued by the State Intellectual Property Office of China dated Aug. 24, 2015 for Chinese counterpart application No. 201380024836.9.
First Notification of Reason for Refusal with Search Report issued by the State Intellectual Property Office of China dated Aug. 26, 2015 for Chinese counterpart application No. 201380009242.0.
Second Notification of Reason for Refusal with issued by the State Intellectual Property Office of China dated Feb. 5, 2016 for Chinese counterpart application No. 201380024836.9.
First Office Action issued in Chinese Patent Appln. Serial No. 201980007372.8, dated Sep. 27, 2021, with English translation, 13 pages.
First Office Action issued in Chinese Patent Appln. Serial No. 201980010219.0, dated Nov. 30, 2021, with English translation, 13 pages.
International Preliminary Report on Patentability and Written Opinion issued in PCT/JP2013/070713, dated Feb. 10, 2015.
International Search Report (ISR) dated Oct. 29, 2013, issued for International application No. PCT/JP2013/070713.
International Search Report and Written Opinion issued in PCT/JP2013/070714, dated Oct. 29, 2013, with English translation, 14 pages.
International Preliminary Report on Patentability issued in PCT/JP2013/070714, dated Feb. 10, 2015.
International Search Report and Written Opinion issued in PCT/JP2019/003381, with English translation, dated Apr. 2, 2019, 20 pages.
International Preliminary Report on Patentability issued in PCT/JP2019/003381, with English translation, dated Aug. 4, 2020, 12 pages.
International Search Report and Written Opinion issued in PCT/JP2019/000617, dated Apr. 10, 2019, with English translation, 21 pages.
International Preliminary Report on Patentability issued in PCT/JP2019/000617, dated Jul. 14, 2020, with English translation, 13 pages.
International Search Report and Written Opinion issued in PCT/JP2020/003645, dated Mar. 24, 2020, with English translation, 21 pages.
International Preliminary Report on Patentability issued in PCT/JP2020/003645, dated Aug. 10, 2021, with English translation, 11pages.
International Search Report and Written Opinion issued in PCT/JP2020/003641, dated Mar. 31, 2020, with English translation, 13 pages.
International Preliminary Report on Patentability issued in PCT/JP2020/003641, dated Aug. 10, 2021, with English translation, 7 pages.
International Search Report and Written Opinion issued in PCT/JP2020/003643, dated Mar. 17, 2020, with English translation, 17 pages.
International Preliminary Report on Patentability issued in PCT/JP2020/003643, dated Aug. 10, 2021, with English translation, 10 pages.
International Search Report and Written Opinion issued in PCT/JP2020/003648, dated Mar. 10, 2020, with English translation, 13 pages.
International Preliminary Report on Patentability issued in PCT/JP2020/003648, dated Aug. 10, 2021, with English translation, 7 pages.
International Search Report and Written Opinion issued in PCT/JP2020/003647, dated Mar. 24, 2020, with English translation, 14 pages.
International Preliminary Report on Patentability issued in PCT/JP2020/003647, dated Aug. 10, 2021, with English translation, 8 pages.
International Search Report and Written Opinion issued in PCT/JP2020/011926, dated Apr. 28, 2020, with English translation, 12 pages.
International Preliminary Report on Patentability issued in PCT/JP2020/011926, dated Sep. 28, 2021, 4 pages.
Korean Official Action issued in related Korean Patent Application Serial No. 10-2020-7019822, dated Oct. 26, 2021 with English translation (4 pages).
European Search Report issued in related European Patent Application Serial No. 19738181.7, dated Sep. 13, 2021 (10 pages).
European Search Report issued in related European Patent Application Serial No. 19748058.5, dated Oct. 8, 2021 (9 pages).

(56) References Cited

OTHER PUBLICATIONS

Office Action issued in U.S. Appl. No. 16/964,943, dated Oct. 4, 2021, 19 pages.
International Search Report and Written Opinion and International Preliminary Report on Patentability issued in PCT/JP2017/040830, dated Jan. 30, 2018, with English translations, 15 pages.
European Search Report issued in related European Patent Application Serial No. 20777157.7, dated Oct. 28, 2022 (7 pages).
European Search Report issued in related European Patent Application Serial No. 20752626.0, dated Oct. 4, 2022 (7 pages).
European Search Report issued in related European Patent Application Serial No. 20753172.4, dated Oct. 4, 2022 (7 pages).
Notice of Allowance issued in U.S. Appl. No. 16/959,105, dated Nov. 3, 2022, 9 pages.
Notice of Allowance issued in U.S. Appl. No. 17/690,911, dated Nov. 25, 2022, 11 pages.
Chinese Official Action issued in related Chinese Patent Application Serial No. 201980007372.8, dated Nov. 15, 2022 with translation, 7 pages.
Chinese Official Action issued in related Chinese Patent Application Serial No. 202080010661.6, dated Nov. 30, 2022 with translation, 15 pages.
U.S. Appl. No. 16/959,105, filed Jun. 29, 2020, Imura.
U.S. Appl. No. 16/964,943, filed Jul. 24, 2020, Imura et al.
U.S. Appl. No. 17/424,850, filed Jul. 21, 2021, Ou et al.
U.S. Appl. No. 17/425,277, filed Jul. 22, 2021, Imura et al.
U.S. Appl. No. 17/425,281, filed Jul. 22, 2021, Suzuki.
U.S. Appl. No. 17/425,678, filed Jul. 23, 2021, Suzuki et al.
U.S. Appl. No. 17/433,561, filed Aug. 24, 2021, Miyazaki et al.
Second Office Action issued in Chinese Patent Appln. Serial No. 2019800073728, dated May 26, 2022, with English translation, 13 pages.
First Office Action issued in Chinese Patent Appln. Serial No. 202080010586.3, dated Aug. 8, 2022, with English translation, 15 pages.
First Office Action issued in Chinese Patent Appln. Serial No. 202080010580.6, dated Aug. 2, 2022, with English translation, 12 pages.
First Office Action issued in Chinese Patent Appln. Serial No. 202080010628.3, dated Aug. 2, 2022, with English translation, 15 pages.
First Office Action issued in Chinese Patent Appln. Serial No. 202080010661.6, dated Jul. 19, 2022, with English translation, 15 pages.
First Office Action issued in Chinese Patent Appln. Serial No. 202080011045.2, dated Jul. 18, 2022, with English translation, 10 pages.
First Office Action issued in Chinese Patent Appln. Serial No. 202080018532.1, dated Aug. 24, 2022, with English translation, 14 pages.
European Search Report issued in related European Patent Application Serial No. 20752802.7, dated Oct. 11, 2022 (7 pages).
European Search Report issued in related European Patent Application Serial No. 20752708, dated Oct. 4, 2022 (7 pages).
European Search Report issued in related European Patent Application Serial No. 20752625, dated Oct. 4, 2022 (10 pages).
European Search Report issued in related European Patent Application Serial No. 20752802, dated Oct. 11, 2022 (7 pages).
European Search Report issued in related European Patent Application Serial No. 20752709, dated Oct. 11, 2022 (9 pages).
Office Action issued in U.S. Appl. No. 16/959,105, dated Mar. 25, 2022, 39 pages.
Notice of Allowance issued in U.S. Appl. No. 16/322,811, dated Apr. 19, 2022, 11 pages.
Notice of Allowance issued in U.S. Appl. No. 16/964,943, dated Jan. 11, 2022, 8 pages.
Korean Official Action issued in related Korean Patent Application Serial No. 10-2020-7022307, dated Nov. 26, 2021 with translation, 13 pages.
Official Action issued in European Patent Application Serial No. 17841422.3, dated Feb. 15, 2022, 5 pages.
Chinese Official Action issued in related Chinese Patent Application Serial No. 201980010219.0, dated Apr. 18, 2022 with translation, 17 pages.
Chinese Official Action issued in related Chinese Patent Application Serial No. 202080010586.3, dated Jan. 12, 2023 with translation, 11 pages.
Chinese Official Action issued in related Chinese Patent Application Serial No. 202080010628.3, dated Feb. 21, 2023 with translation, 14 pages.
Korean Official Action issued in related Korean Patent Application Serial No. 10-2021-7025489, dated Dec. 14, 2022 with translation, 23 pages.
Korean Official Action issued in related Korean Patent Application Serial No. 10-2021-7025490, dated Dec. 14, 2022 with translation, 10 pages.
Korean Official Action issued in related Korean Patent Application Serial No. 10-2021-7025491, dated Dec. 15, 2022 with translation, 12 pages.
Official Action issued in related U.S. Appl. No. 17/424,847, dated Feb. 2, 2023, 6 pages.
Chinese Official Action issued in related Chinese Patent Application Serial No. 202080018532.1, dated Feb. 17, 2023 with translation, 7 pages.
Chinese Official Action issued in related Chinese Patent Application Serial No. 202080010580.6, dated Mar. 17, 2023 with translation, 12 pages.
European Official Action issued in related European Patent Application Serial No. 19748058.5, dated Mar. 17, 2023 (5 pages).

\* cited by examiner

Fig.3 A-A CROSS-SECTIONAL VIEW
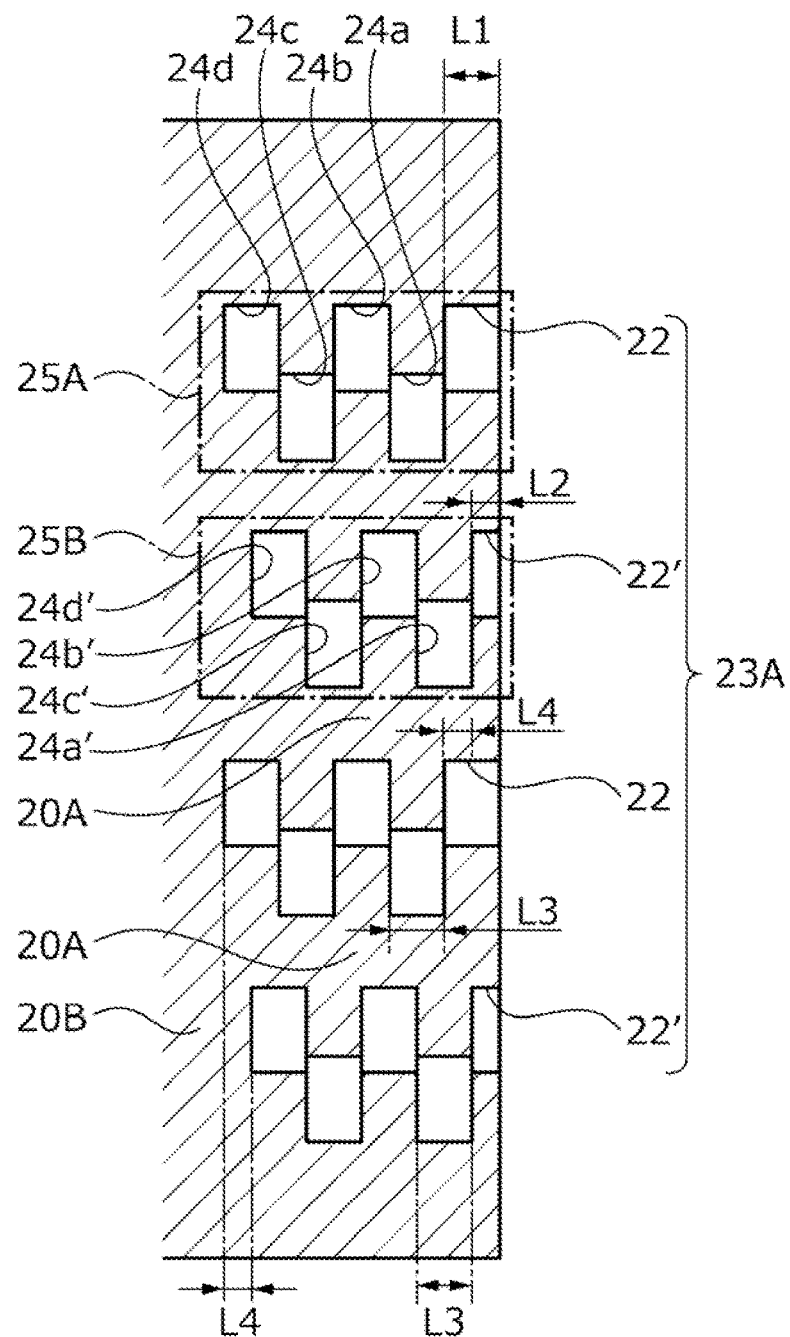

US 11,852,244 B2

SLIDING COMPONENT AND METHOD OF MANUFACTURING SLIDING MEMBER

TECHNICAL FIELD

The present invention relates to a sliding component and a method of manufacturing the sliding member. The sliding component includes a pair of sliding members that rotate relative to each other and are used for, for example, a shaft sealing device shaft-sealing a rotary shaft of a rotating machine in the automotive seal field, the general industrial machinery seal field, or another seal field or a bearing of a machine in the automotive bearing field, the general industrial machinery bearing field, or another bearing field.

BACKGROUND ART

Examples of a shaft sealing device preventing sealed fluid leakage include a mechanical seal and a slide bearing. The mechanical seal, the slide bearing, or the like includes sliding components rotating relative to each other and including a pair of sliding members such that sliding surfaces slide with each other. In such sliding components, the conditions of "sealing" and "lubrication" have to be met together in the interest of long-term sealability maintenance. In recent years in particular, it has been desired for environmental measures or the like to further reduce friction so that the energy that is lost due to sliding is reduced and sealed fluid leakage is prevented at the same time. The friction reduction can be achieved by inter-sliding surface dynamic pressure being generated by rotation and sliding being performed with a liquid film interposed.

For example, in the sliding component described in Patent Citation 1, a plurality of dimples recessed in a cross-sectional view are provided in the entire region of the sliding surface of one of a pair of sliding members. When the pair of sliding members rotate relative to each other, a sealed fluid is supplied to the dimples provided in the sliding member, dynamic pressure is generated between the sliding surfaces, the sliding surfaces are slightly separated from each other, and the dimples hold the sealed fluid. As a result, the sliding surfaces can be slid with each other with a liquid film interposed between the sliding surfaces, and thus mechanical loss reduction and sealed fluid leakage prevention can be achieved at the same time.

CITATION LIST

Patent Literature

Patent Citation 1: JP 2015-68330 A (Page 5, FIG. 3)

SUMMARY OF INVENTION

Technical Problem

Although the lubricity between the sliding surfaces is enhanced by the dimples being provided in the sliding component of Patent Citation 1, the depth of the dimples gradually decreases due to the wear of the sliding surfaces attributable to aging or the like, and then the sealed fluid cannot be sufficiently held and a decline in lubricity may arise between the sliding surfaces.

The present invention has been made in view of such problems, and an object of the present invention is to provide a sliding component capable of sustaining inter-sliding surface lubricity for a long time and a method of manufacturing a sliding member partially forming the sliding component.

Solution to Problem

In order to solve the above problem, a sliding component according to a first aspect of the present invention is a sliding component including a pair of sliding members, at least one of the sliding members being provided with: a group of recessed portions including a plurality of recessed portions formed in a sliding surface of the one of the sliding members; and a plurality of hollow portions formed inside the one of sliding members so as to be out of alignment with the recessed portions in a thickness direction of the one of the sliding members, and the hollow portions are disposed so as to generate at least part of a new group of recessed portions until the one of the sliding members is worn by a thickness of deepest one of the recessed portions. According to the aforesaid feature of the first aspect of the present invention, even when the sliding surface of the one of the sliding members wears to the thickness direction of the deepest recessed portion of the group of recessed portions, a new group of recessed portions including the plurality of recessed portions appears on the sliding surface, and thus the lubricity between the sliding surfaces can be sustained.

It may be preferable that a range of fluctuation of the volume of the group of recessed portions formed in the sliding surface is within 20% while the one of the sliding members is worn by the thickness of the deepest recessed portion of the group of recessed portions. According to this preferable configuration, even when the sliding surface wears, the range of fluctuation of the volume of the group of recessed portions is as small as within 20%, and thus lubricity fluctuations depending on the degree of wear of the sliding surface can be suppressed.

It may be preferable that the hollow portions are disposed so as to overlap the recessed portions in part or in whole in a view from a direction orthogonal to the sliding surface. According to this preferable configuration, a significant fluctuation in the appearance position of the recessed portion in the sliding surface depending on the degree of wear of the sliding surface can be suppressed.

It may be preferable that the recessed portions of the group of recessed portions have different depths. According to this preferable configuration, the volume of the group of recessed portions appearing on the sliding surface is capable of approaching a constant volume regardless of the position of the sliding surface in the region of use of the one of the sliding members.

It may be preferable that throttle passages extending in the thickness direction allow the recessed portions and the hollow portions to communicate with each other. According to this preferable configuration, a sealed fluid can be held in the recessed portion and the hollow portion. In addition, some of the wear debris on the sliding surface can be discharged to the hollow portion side via the throttle passage, and thus wear debris accumulation in the recessed portion can be suppressed.

It may be preferable that the throttle passages are formed at partially overlapping portions of the recessed portions and the hollow portions. According to this preferable configuration, the sealed fluid or wear debris easily moves between the recessed portion and the hollow portion.

It may be preferable that the hollow portions are equal to each other in shape. According to this preferable configuration, the hollow portions are easily disposed such that the volume of the group of recessed portions appearing on the sliding surface is constant in the region of use.

It may be preferable that each of the hollow portions has at least a flat surface. According to this preferable configuration, the hollow portions can be disposed with efficiency.

It may be preferable that a base material of the one of the sliding members between adjoining two of the recessed portions continuously extends in the thickness direction from the sliding surface to a surface on a side opposite to the sliding surface. According to this preferable configuration, the strength of the sliding surface can be enhanced.

In order to solve the above problem, a sliding component according to a second aspect of the present invention is a sliding component including a pair of sliding members, at least one of the sliding members being provided with: recessed portions formed in a sliding surface of the one of the sliding members, each of the recessed portions having a flat surface; and hollow portions formed inside the one of the sliding members so as to be disposed at a position deeper than the recessed portions, the hollow portions having flat surfaces and communicating with the recessed portions. According to the aforesaid feature of the second aspect of the present invention, the hollow portions provided at the position deeper than the recessed portions appear on the sliding surface even when the sliding surface of the one of the sliding members wears and the recessed portions disappears. Accordingly, the lubricity between the sliding surfaces can be sustained.

It may be preferable that the hollow portions are positioned out of alignment with the recessed portions in a circumferential direction or a radial direction. According to this preferable configuration, the sealed fluid or wear debris easily moves between the recessed portion and the hollow portion.

It may be preferable configuration that the flat surfaces of the recessed portions are bottom surfaces of the recessed portions and the flat surfaces of the hollow portions are bottom surfaces of the hollow portions. According to this preferable configuration, the hollow portions can be disposed with efficiency.

It may be preferable that the hollow portions are positioned out of alignment in a circumferential direction or a radial direction in a state in which the hollow portions partially overlap bottom surfaces of the recessed portions in an axial direction and the hollow portions are continuously provided so as to communicate with the recessed portions at points overlapping the bottom surfaces of the recessed portions in the axial direction. According to this preferable configuration, the hollow portions can be disposed with efficiency and the sealed fluid or wear debris easily moves between the recessed portion and the hollow portion.

In order to solve the above problem, a manufacturing method according to a third aspect of the present invention is a method of a sliding member provided with a group of recessed portions including a plurality of recessed portions formed in a sliding surface of the sliding member, and having a recessed shape in a cross-sectional view and a plurality of hollow portions formed inside the sliding member, the hollow portions being disposed so as to generate at least part of a new group of recessed portions until the sliding member is worn by a thickness of deepest one of the recessed portions, the method comprising steps of: laminating layers made of base material and each having holes; and coupling the layers together. According to the aforesaid feature of a third aspect of the present invention, even when the sliding surface of the one of the sliding members wears to the thickness direction of the deepest recessed portion of the group of recessed portions, a new group of recessed portions including the plurality of recessed portions appears on the sliding surface, and thus the lubricity between the sliding surfaces can be sustained. In addition, the plurality of hollow portions can be disposed at desired positions in the one sliding member by the predetermined material being formed while being laminated in the thickness direction of the one sliding member.

It may be preferable that the method of manufacturing the sliding member further comprises a step of forming throttle passage communicating the recessed portions and the hollow portions in a thickness direction of the sliding member. According to this preferable manner, the processing powder generated as a result of processing can be discharged from the hollow portion to the outside via the throttle passage, and thus the sliding member can be manufactured with ease and high accuracy.

It may be preferable that the laminating step and the coupling step are carried out by an additive manufacturing device. According to this preferable manner, the sliding member can be manufactured with ease and high accuracy using a printer as the additive manufacturing device.

It may be preferable that in the laminating step and the coupling step, the layers are laminated on a base member and integrated with the base member. According to this preferable manner, the strength of the sliding member can be ensured by the base member and the manufacturing can be expedited.

BRIEF DESCRIPTION OF DRAWINGS

FIG. 3 is a cross-sectional view taken along line A-A.

FIG. 4B is a schematic view in which FIG. 4A is viewed from the sliding surface side.

DESCRIPTION OF EMBODIMENTS

Modes for implementing the sliding component and the method of manufacturing the sliding member according to the present invention will be described below based on embodiments.

First Embodiment

The sliding component and the method of manufacturing the sliding member according to the first embodiment will be described with reference to FIGS. 1 to 7. It should be noted that a mode in which the sliding component is a mechanical seal will be described as an example in the present embodiment. In addition, in the following description, the outer peripheral side of the sliding component constituting the mechanical seal is a sealed fluid side and the inner peripheral side is an atmosphere side.

Figure 1:
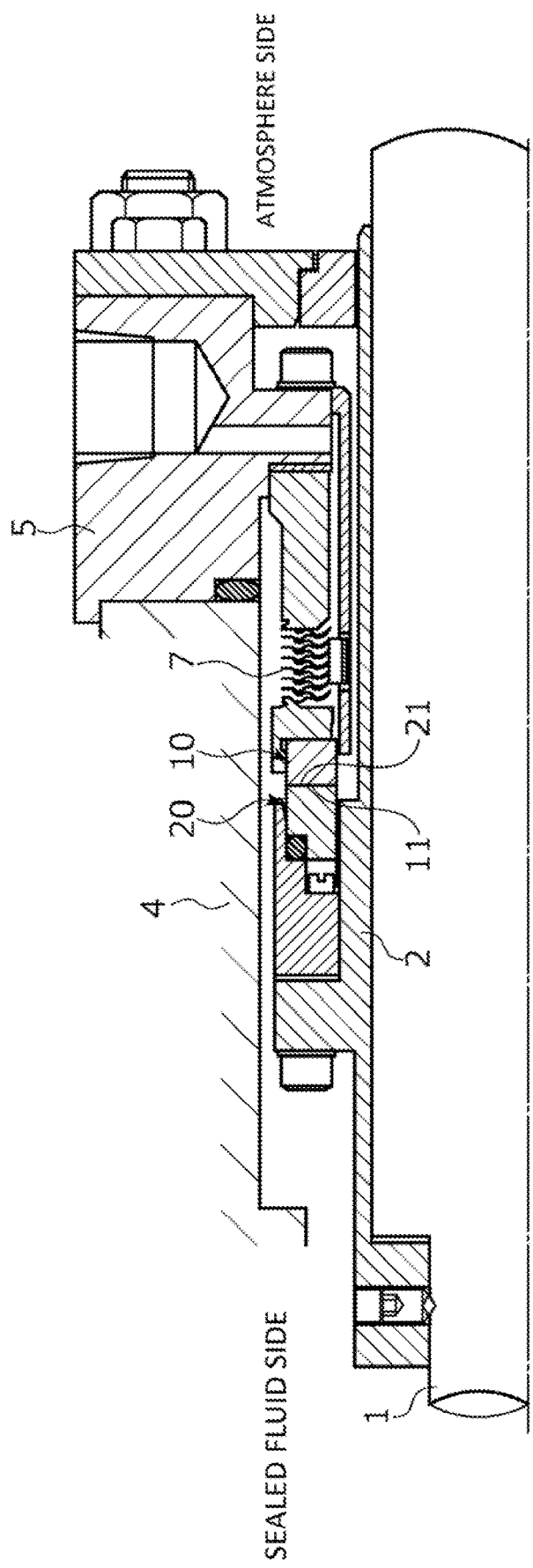
FIG. 1 is a cross-sectional view illustrating an example of a mechanical seal as a sliding component according to a first embodiment of the present invention.

The mechanical seal for general industrial machinery illustrated in FIG. 1 is an inside-type mechanical seal that seals a sealed fluid to leak from the outer peripheral side toward the inner peripheral side of a sliding surface. The mechanical seal mainly includes a mating ring 20, which is one circular ring-shaped sliding component provided on a rotary shaft 1 in a state of being rotatable integrally with the rotary shaft 1 via a sleeve 2, and a circular ring-shaped seal ring 10, which is the other sliding component provided on a seal cover 5 fixed to a housing 4 of an attached device in a non-rotating state and a state of being movable in the axial direction. A sliding surface 11 of the seal ring 10 and a sliding surface 21 of the mating ring 20 slide closely with each other by a bellows 7 urging the seal ring 10 in the axial direction. It should be noted that the sliding surface 11 of the seal ring 10 is a flat surface and the flat surface is not provided with a recessed portion.

The seal ring 10 and the mating ring 20 are typically formed of a combination of SiC (as an example of hard material) or a combination of SiC and carbon (as an example of soft material). However, the present invention is not limited thereto and any sliding material can be applied insofar as it is used as a sliding material for a mechanical seal. It should be noted that the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC—TiC, and SiC—TiN. As the carbon, resin-molded carbon, sintered carbon, and the like can be used, including carbon in which carbon and graphite are mixed. In addition to the above sliding materials, a metal material, a resin material, a surface modification material (e.g., coating material), a composite material, and the like can also be applied. It should be noted that a method for manufacturing the mating ring 20 will be described in detail later.

Figure 2:
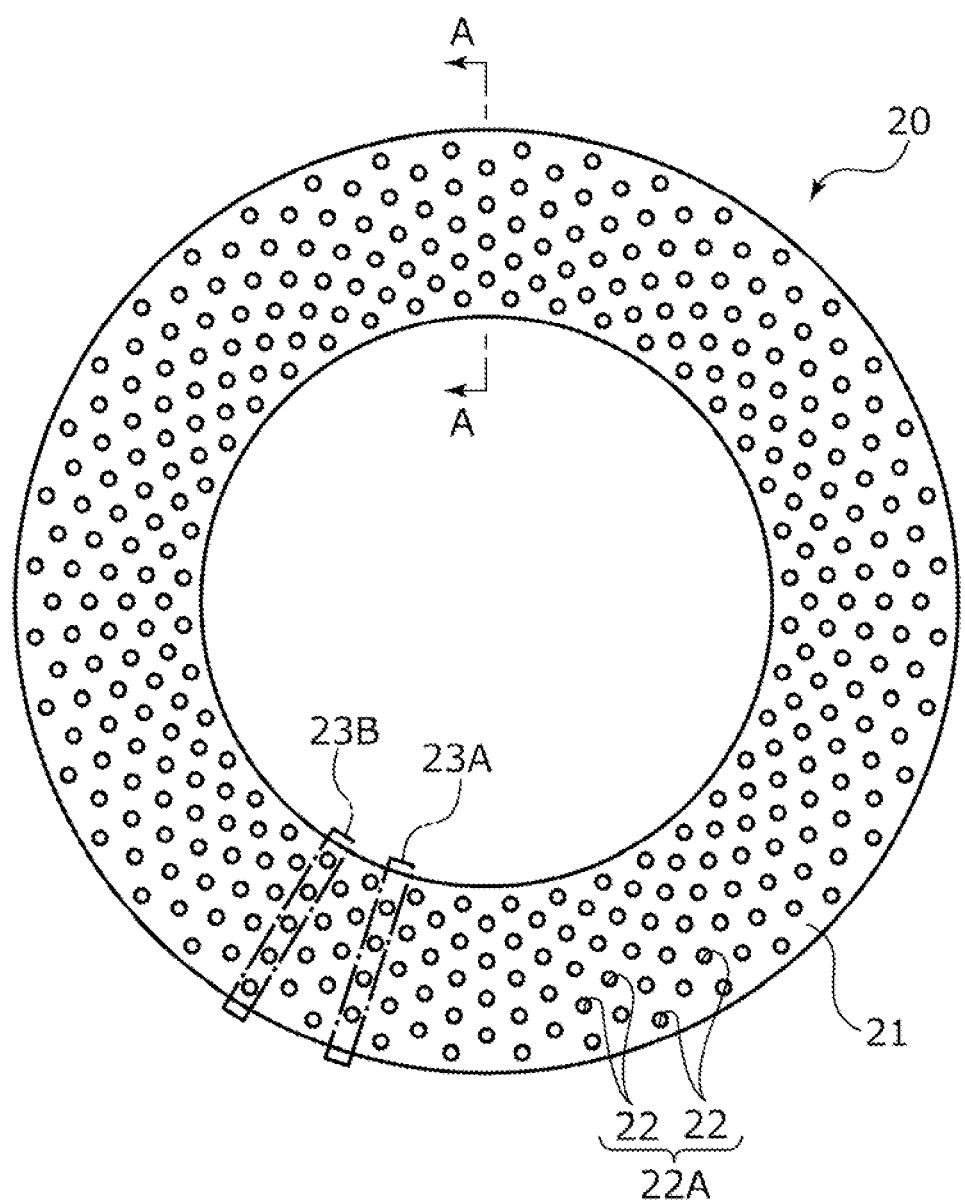
FIG. 2 is a plan view illustrating a sliding surface of a mating ring according to the first embodiment of the present invention.

As illustrated in FIG. 2, the mating ring 20 has the annular sliding surface 21 facing the sliding surface 11 of the seal ring 10 in the axial direction. The sliding surface 21 is a flat surface, and dimples 22 as recessed portions are formed in the entire surface in the circumferential direction to constitute a dimple group 22A as a group of recessed portions. Each dimple 22 has a circular shape when viewed from a direction orthogonal to the sliding surface 21 and has a recessed shape opening to the sliding surface 21 side in a radial cross-sectional view. In other words, the dimples 22 have a columnar shape having a central axis orthogonal to the sliding surface 21 (see FIGS. 3 and 4). It should be noted that the sliding surface 21 can be regarded as a land portion with respect to the dimple 22.

Specifically, the dimple group 22A is configured by a row 23A in which four dimples 22 are disposed apart from the inner diameter side to the outer diameter side of the mating ring 20 and a row 23B in which five dimples 22 are disposed apart from the inner diameter side to the outer diameter side being alternately disposed in the circumferential direction and the two rows 23A and 23B are disposed radially from the center of the mating ring 20. It should be noted that the plurality of dimples 22 are disposed in a zigzag shape in the circumferential direction of the sliding surface 21.

FIG. 3 illustrates a state where the mating ring 20 is axially cut at the position of the row 23A. It should be noted that the row 23B is identical to the row 23A except for the number and thus the row 23B will not be described below.

The row 23A includes the dimple 22 with a depth dimension L1 and a dimple 22' with a depth dimension L2 shallower than the dimple 22 (L1>L2). The dimples 22 and 22' are alternately arranged in the radial direction of the sliding surface 21.

In the dimple 22, a plurality of hollow portions 24a, 24b, 24c, and 24d are formed in the thickness direction of the mating ring 20 (hereinafter, simply referred to as the thickness direction in some cases) and a recessed unit 25A is configured by the dimple 22 and the hollow portions 24a, 24b, 24c, and 24d. Likewise, in the dimple 22', a plurality of hollow portions 24a', 24b', 24c', and 24d' are arranged in parallel in the thickness direction and a recessed unit 25B is configured by the dimple 22' and the hollow portions 24a', 24b', 24c', and 24d'.

The hollow portions 24a to 24d and the hollow portions 24a' to 24d' have the same depth dimension L3, and the depth dimension L3 of each hollow portion is equal to the depth dimension L1 of the dimple 22 that is a new product. In addition, the difference between the depth dimension L1 of the dimple 22 and the depth dimension L2 of the dimple 22' is a dimension L4. In other words, the recessed unit 25A and the recessed unit 25B are disposed out of alignment with each other by the dimension L4 in the thickness direction of the mating ring 20. It should be noted that the region of use in the thickness direction that can be used as the sliding surface 21 in the mating ring 20 is a region where any hollow portion is capable of appearing and functioning as a dimple even due to wear or the like and refers to the region from the sliding surface 21 to the bottom portion of the hollow portion 24d disposed in the deepest portion of the recessed unit 25A.

Next, the arrangement of the dimple 22 and the hollow portions 24a to 24d in the recessed unit 25A will be described with reference to FIG. 4. It should be noted that the recessed unit 25B has the same configuration as the recessed unit 25A and thus the recessed unit 25B will not be described.

Figure 4A:
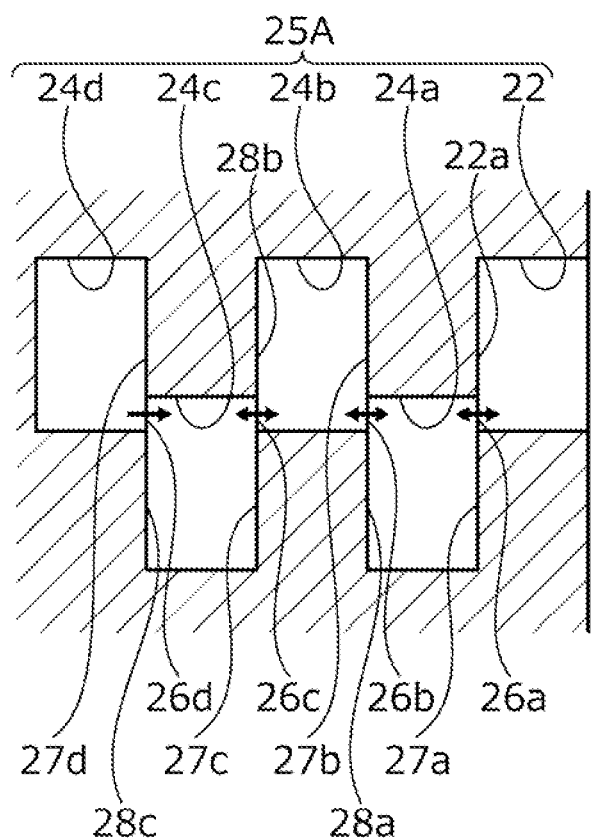
FIG. 4A is a schematic cross-sectional view illustrating a dimple and a hollow portion disposed in a thickness direction according to the first embodiment of the present invention.

As illustrated in FIG. 4A, the hollow portion 24a is disposed out of alignment in the inner diameter direction of the dimple 22 and so as to be partially overlapped in the thickness direction and a passage 26a allows the dimple 22 and the hollow portion 24a to communicate with each other. Likewise, the hollow portion 24b is disposed out of alignment in the outer diameter direction of the hollow portion 24a and so as to be partially overlapped in the thickness direction and a passage 26b allows the hollow portion 24a and the hollow portion 24b to communicate with each other. In addition, the hollow portion 24c is disposed out of alignment in the inner diameter direction of the hollow portion 24b and so as to be partially overlapped in the thickness direction and a passage 26c allows the hollow portion 24b and the hollow portion 24c to communicate with each other. In addition, the hollow portion 24d is disposed out of alignment in the outer diameter direction of the hollow portion 24c and so as to be partially overlapped in the thickness direction and a passage 26d allows the hollow portion 24c and the hollow portion 24d to communicate with each other. In other words, the dimple 22 and the hollow portions 24a to 24d are alternately misaligned in the radial direction, are disposed in a zigzag shape in the thickness direction, and mutually communicate through the passages 26a to 26d.

In addition, an end surface 27a as the flat surface that is on the sliding surface 21 side in the hollow portion 24a is disposed at the same position in the thickness direction as a bottom surface 22a as a flat surface of the dimple 22 and the passage 26a is formed by the end surface 27a and the bottom surface 22a partially overlapping in the radial direction. In other words, the passage 26a is formed by the opening point of the end surface 27a and the opening point of the bottom surface 22a overlapping. Likewise, in the hollow portions 24b to 24d, end surfaces 27b to 27d on the sliding surface 21 side are disposed at the same positions in the thickness direction as bottom surfaces 28a to 28c of the hollow portions 24a to 24c adjacent to the sliding surface 21 side and the passages 26b to 26d are formed by the end surfaces 27b to 27d and the bottom surfaces 28a to 28c partially overlapping in the radial direction. In other words, the passages 26a to 26d are throttle passages smaller than the radial cross-sectional area of the dimple 22 and the hollow portions 24a to 24d.

Figure 4B:
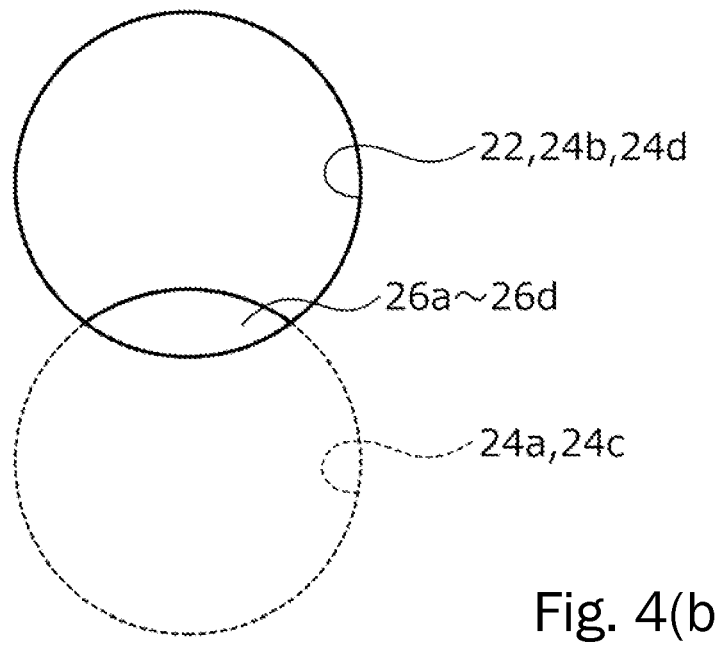

More specifically, as illustrated in FIG. 4B, the dimple 22 and the hollow portions 24b and 24d are disposed so as to overlap when viewed from the direction orthogonal to the sliding surface 21 and the hollow portions 24a and 24c are disposed so as to overlap when viewed from the direction orthogonal to the sliding surface 21 at positions misaligned to the inner diameter side of the dimple 22 and the hollow portions 24b and 24d.

Figure 5C:
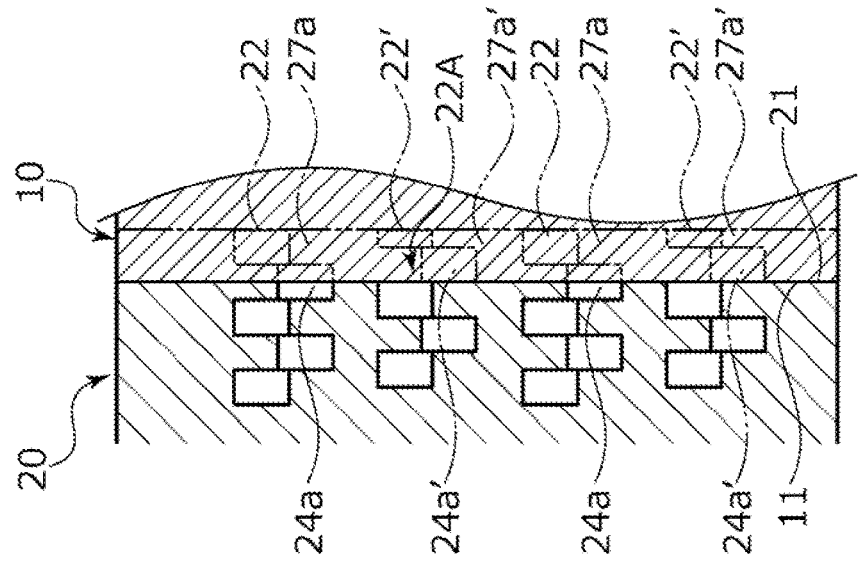
FIGS. 5A to 5C are schematic views illustrating a change in the degree of wear of the sliding surface.

Next, a change in the degree of wear of the mating ring 20 will be described with reference to FIGS. 5 and 6. FIG. 5A is a view cut at the A-A position in FIG. 2 and illustrates a state where the seal ring 10 and the mating ring 20 are new products. When the seal ring 10 and the mating ring 20 rotate relative to each other from the state of FIG. 5A, the dimples 22 and 22' form a film of the sealed fluid between the sliding surfaces 11 and 21 and satisfactory lubrication can be maintained. This is because the dimple group 22A is designed to have the optimal volume for maintaining the lubricity between the sliding surfaces 11 and 21 (see point P1 in FIG. 6).

Figure 5B:
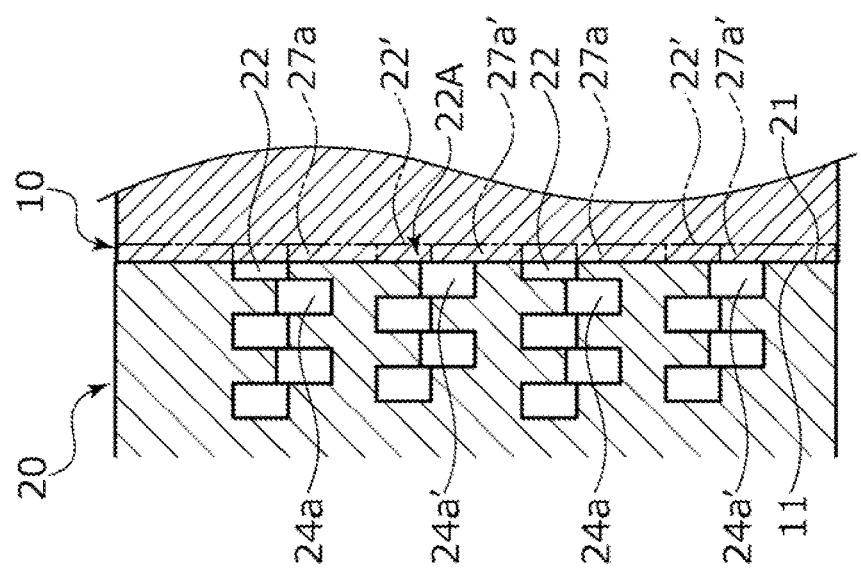
Figure 5A:
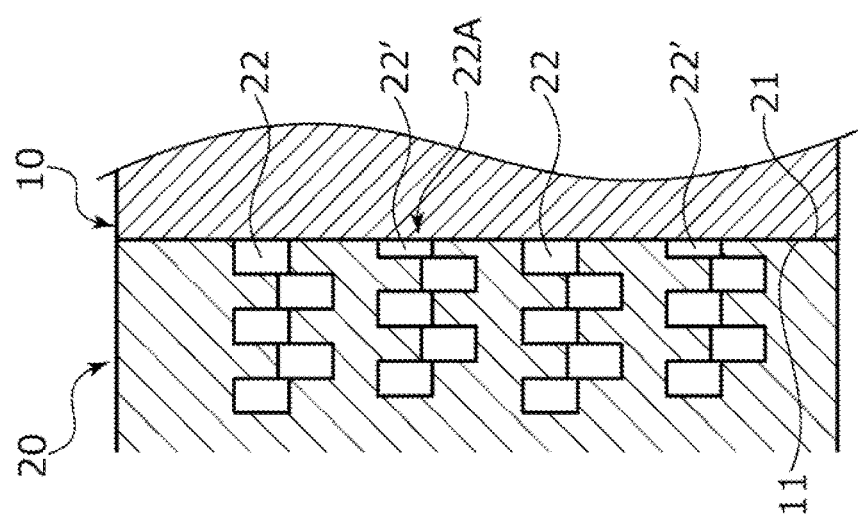
Figure 6:
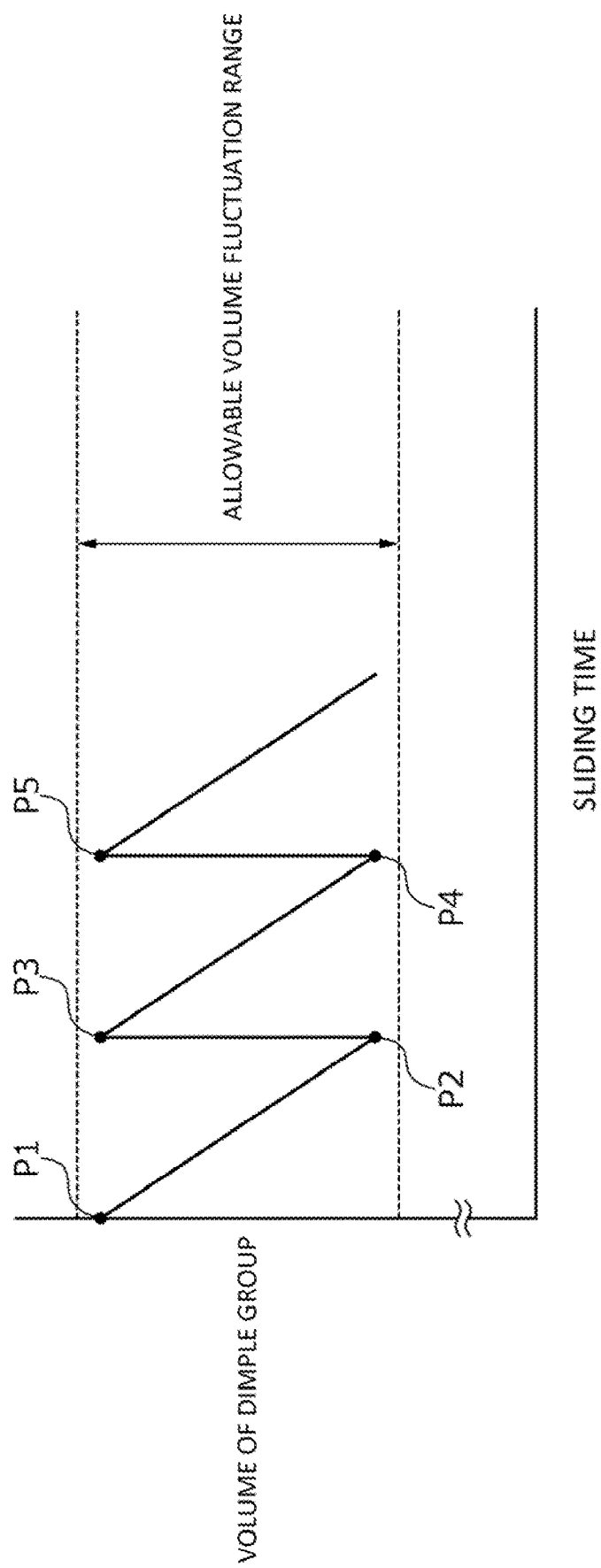
FIG. 6 is a schematic view illustrating a change in the volume of a dimple group with respect to sliding time.

As illustrated in FIG. 5B, the volume of the dimple group 22A configured by the dimples 22 and 22' gradually decreases as the sliding surface 21 wears due to aging or the like (see the section between points P1 and P2 in FIG. 6). However, when the dimple 22' has disappeared (see point P2 in FIG. 6), the wall portion constituting an end surface 27a' of the hollow portion 24a' on the sliding surface 21 side is scraped and the hollow portion 24a' opens to the seal ring 10 side. In other words, the hollow portion 24a' appears as a new dimple and, as a result, the volume of the dimple group 22A increases to a volume close to the volume in the new product state (see point P3 in FIG. 6).

When the sliding surface 21 further wears subsequently as illustrated in FIG. 5C, the volume of the dimple group 22A configured by the dimple 22 and the hollow portion 24a' gradually decreases (see the section between points P3 and P4 in FIG. 6). However, when the dimple 22 has disappeared, the wall portion constituting the end surface 27a of the hollow portion 24a is scraped and the hollow portion 24a opens to the seal ring 10 side. In other words, the hollow portion 24a appears as a new dimple and, as a result, the volume of the dimple group 22A increases to a volume close to the volume in the new product state (see point P5 in FIG. 6).

In this manner, the volume of the dimple group 22A always falls within an allowable fluctuation range in the region of use of the mating ring 20 even when the sliding surface 21 of the mating ring 20 wears, and thus poor lubrication does not arise between the sliding surfaces 11 and 21, a decline in lubricity or sealability attributable to excessive buoyancy generation between the sliding surfaces 11 and 21 can be prevented, and the lubricity between the sliding surfaces 11 and 21 can be preferably sustained.

In addition, the range of fluctuation of the volume of the dimple group 22A appearing on the sliding surface 21 is within 20%. Since the range of fluctuation is small, lubricity fluctuations depending on the degree of wear of the sliding surface 21 can be suppressed. It should be noted that the dimple group 22A appearing on the sliding surface 21 in the region of use of the mating ring 20 may be formed by a different number (two or more) of hollow portions although a mode in which the dimple group 22A is formed by the same number of hollow portions in the region of use of the mating ring 20 is exemplified in the first embodiment. In the region of use of the mating ring 20, the range of fluctuation of the volume of the dimple group 22A appearing on the sliding surface 21 may be preferably within 20% and may be preferably within 5%.

In addition, the hollow portions 24a to 24d and the hollow portions 24a' to 24d' constituting the recessed units 25A and 25B are disposed so as to overlap the dimples 22 and 22' in part or in whole when viewed from the direction orthogonal to the sliding surface 21. Accordingly, the positions of the hollow portions 24a to 24d and the hollow portions 24a' to 24d' appearing as dimples do not significantly fluctuate in the radial and circumferential directions of the sliding surface 21 depending on the degree of wear of the sliding surface 21 and a film of the sealed fluid can be evenly generated between the sliding surfaces 11 and 21.

Further, the occupied areas of the recessed units 25A and 25B in the radial and circumferential directions can be reduced when viewed from the direction orthogonal to the sliding surface 21, and thus multiple recessed units 25A and 25B can be disposed in the mating ring 20.

In addition, the hollow portions 24a to 24d and 24a' to 24d' of the recessed units 25A and 25B are alternately misaligned in the radial direction and disposed in a zigzag shape in the thickness direction with respect to the respective dimples 22 and 22' and the recessed units 25A and 25B are misaligned in the thickness direction. In other words, the dimple group 22A is configured by the plurality of dimples 22 and 22' with different depths, and thus the mating ring 20 can be configured such that the volume of the dimple group 22A appearing on the sliding surface 21 approaches a constant volume regardless of the position of the sliding surface 21 in the region of use of the mating ring 20.

In addition, the passages 26a to 26d extending in the thickness direction allow the dimples 22 and 22' and the hollow portions 24a to 24d and 24a' to 24d' to communicate. Accordingly, a large amount of sealed fluid can be held in the dimples 22 and 22' and the hollow portions 24a to 24d and 24a' to 24d'. In addition, some of the wear debris on the sliding surface 21 can be discharged and stored on the hollow portion 24a to 24d and 24a' to 24d' sides via the passages 26a to 26d, and thus lubricity impairment between the sliding surfaces 11 and 21 attributable to wear debris accumulation in the dimples 22 and 22' can be suppressed. In addition, the hollow portions 24a to 24d and 24a' to 24d' have a labyrinth structure, and thus it is difficult for the wear debris stored in the hollow portions 24a to 24d and 24a' to 24d' to return to the dimples 22 and 22'. In particular, it is difficult for the wear debris stored on the hollow portion 24 and 24d' sides to return to the dimples 22 and 22'.

Further, the passages 26a to 26d are configured by the dimples 22 and 22' and the hollow portions 24a to 24d and 24a' to 24d' overlapping in part, and thus the sealed fluid or wear debris easily moves between the dimples 22 and 22' and the hollow portions 24a to 24d and 24a' to 24d'. In addition, the dimples 22 and 22' and the hollow portions 24a to 24d and 24a' to 24d' do not have to form a separate throttle passage, and thus the recessed units 25A and 25B are formed with ease.

In addition, the hollow portions 24a to 24d and 24a' to 24d' have the same shape, and thus the hollow portions 24a to 24d and 24a' to 24d' are easily disposed such that the volume of the dimple group 22A appearing on the sliding surface 21 is constant in the region of use.

Further, the hollow portions 24a to 24d and 24a' to 24d' have the flat end surfaces 27a to 27c and the bottom surfaces 28a to 28c. Accordingly, multiple hollow portions 24a to 24d and 24a' to 24d' can be disposed by the end surfaces 27a to 27c and the bottom surfaces 28a to 28c being brought close to each other, that is, can be efficiently disposed in a small space.

In addition, each of the hollow portions 24a to 24d and 24a' to 24d' is formed in a columnar shape having a central axis orthogonal to the sliding surface 21 and the opening region of each of the hollow portions 24a to 24d and 24a' to 24d' does not change depending on the degree of wear of the sliding surface 21. Accordingly, the hollow portions 24a to 24d and 24a' to 24d' are easily disposed such that the volume of the dimple group 22A is constant.

In addition, a base material 20A of the mating ring 20 between the dimples 22 and 22' adjacent in the radial or circumferential direction continuously extends in the thickness direction, in a pillar shape, and with a certain width from the sliding surface 21 to a base member 20B (see FIG. 7, described later) positioned on the side opposite to the sliding surface 21. Accordingly, the sliding surface 21 can be supported with high strength.

Next, a method for manufacturing the mating ring 20 will be described with reference to FIG. 7. The mating ring 20 in the present embodiment is manufactured by a lamination shaping method using a 3D printer, which is a type of additive manufacturing device. It should be noted that the thickness of the layer of SiC powder M, which is a predetermined material to be spread, illustrated in FIG. 7 exceeds the actual thickness so that understanding of the description is facilitated.

Figure 7A:
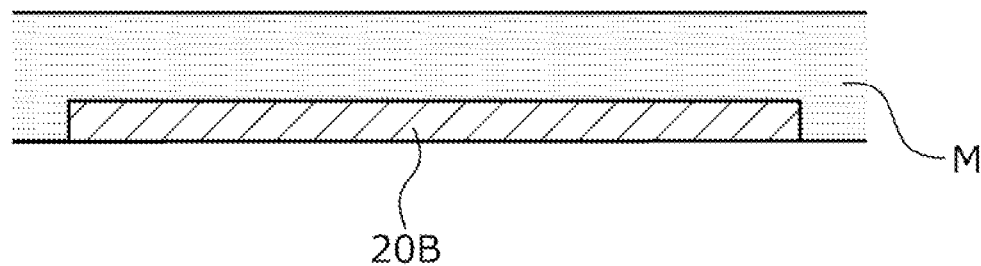
FIGS. 7A to 7C are schematic views illustrating a mating ring manufacturing process.

Specifically, as illustrated in FIG. 7A, the base member 20B having a predetermined thickness and forming a circular plate shape when viewed from the thickness direction is disposed on the pedestal of the 3D printer and the SiC powder M is spread so as to cover the base member 20B as a whole.

Figure 7B:
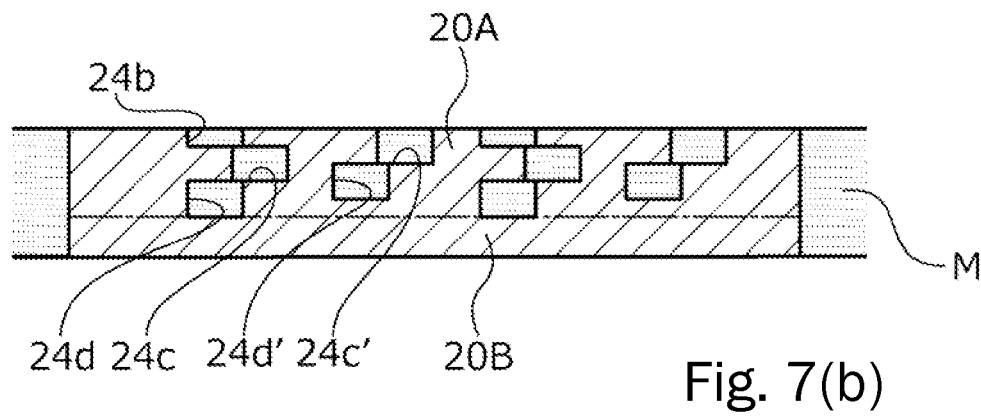

Then, as illustrated in FIG. 7B, the base material 20A in the mating ring 20 is laminated and connected in the thickness direction of the base member 20B by the SiC powder M being melted and solidified by a heat source (not illustrated) such as a laser. At this time, in the laminated SiC powder M, parts other than the parts (specific regions) that become the hollow portions are melted and solidified.

Figure 7C:
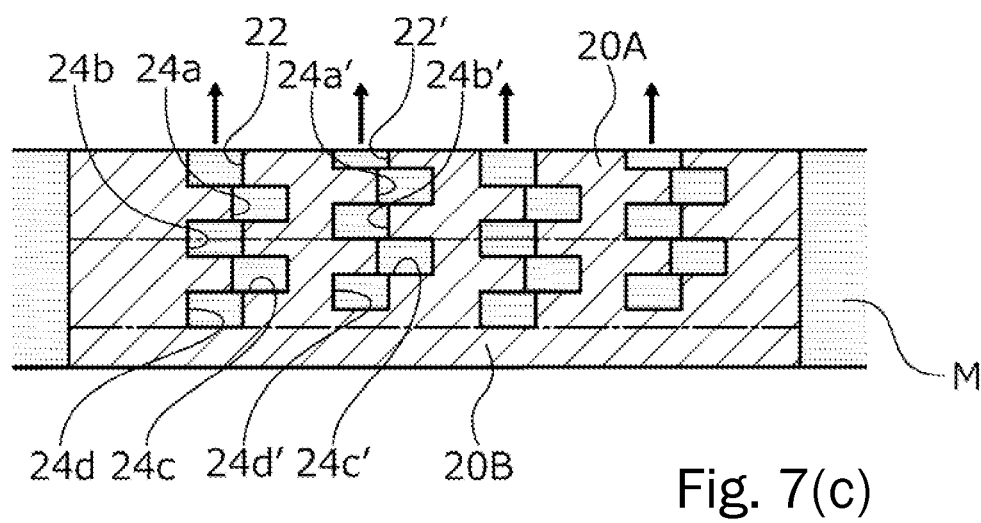

As illustrated in FIG. 7C, the step of spreading the SiC powder M and the step of melting and solidifying the SiC powder M are repeated until the mating ring 20 reaches a desired thickness. When the mating ring 20 reaches the desired thickness, the SiC powder M remaining in the hollow portions 24a to 24d and 24a' to 24d' and the dimples 22 and 22' is discharged out of the opening portions of the dimples 22 and 22' and the manufacturing is completed.

In this manner, the base material 20A is formed by the SiC powder M being laminated and connected in the thickness direction of the mating ring 20 in the region (predetermined material) other than the hollow portions 24a to 24d and 24a' to 24d' and the dimples 22 and 22'. As a result, the mating ring 20 in which the plurality of hollow portions 24a to 24d and 24a' to 24d' and the dimples 22 and 22' are disposed at desired positions can be formed.

In addition, the passages 26a to 26d allow the hollow portions 24a to 24d and 24a' to 24d' and the dimples 22 and 22' to communicate as described above. Accordingly, the unnecessary SiC powder M in the hollow portions 24a to 24d and 24a' to 24d' can be discharged to the outside via the passages 26a to 26d and the mating ring 20 can be manufactured with ease and high accuracy by the 3D printer-based lamination shaping method. By the mating ring 20 being manufactured in this manner, the SiC powder M during the manufacturing does not appear even when the hollow portion becomes a dimple due to wear during the use of the mating ring 20.

In addition, the SiC powder M is laminated and integrated on the base member 20B, and thus the strength of the mating ring 20 can be ensured by the base member 20B and the manufacturing can be expedited. It should be noted that the mating ring 20 may be manufactured directly on the pedestal without the base member 20B being used although a mode in which the SiC powder M is laminated and connected on the base member 20B has been exemplified.

Figure 8A:
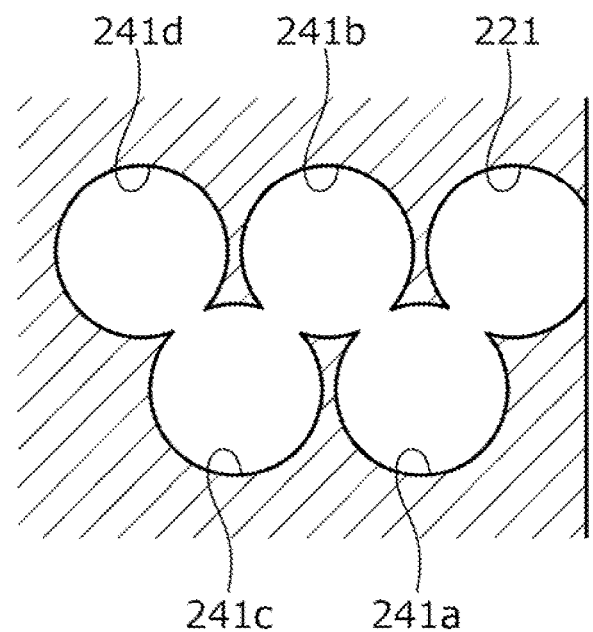
FIGS. 8A and 8B are schematic views illustrating modification examples of the shapes of the dimple and the hollow portion according to the first embodiment of the present invention.

In addition, a dimple 221 and hollow portions 241a to 241d may be spherical as illustrated in, for example, FIG. 8A although a mode in which each dimple and each hollow portion are formed in a columnar shape having a central axis orthogonal to the sliding surface has been exemplified in the first embodiment. It should be noted that the dimple and the hollow portions may be, for example, grooves having a conical shape, a triangular pyramid shape, or a recessed shape that is long in the circumferential or radial direction.

Figure 8B:
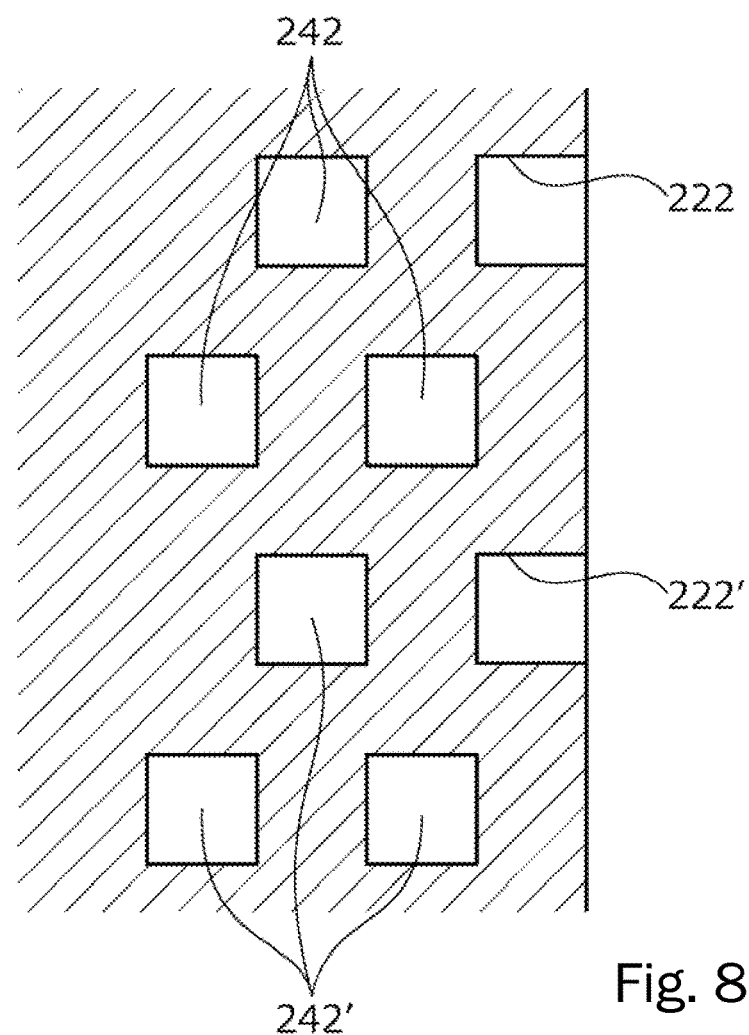

In addition, dimples 222 and 222' and hollow portions 242 may be independently provided so as not to communicate and so as to overlap in the thickness direction when viewed from the circumferential direction as illustrated in FIG. 8B although the dimple and the hollow portion are interconnected by the throttle passage in the first embodiment. It should be noted that a throttle flow path (not illustrated) having a predetermined length may allow the independent dimples 222 and 222' and hollow portions 242 to communicate with each other.

Figure 9A:
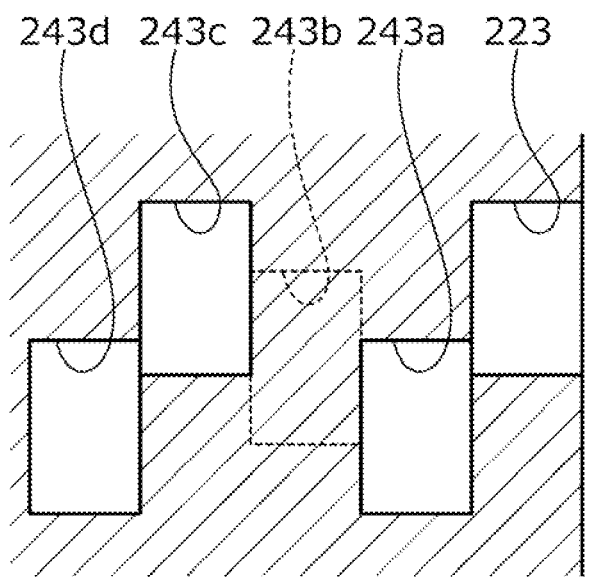
FIG. 9 is a modification example of the disposition of the dimple and the hollow portion according to the first embodiment of the present invention.
Figure 9B:
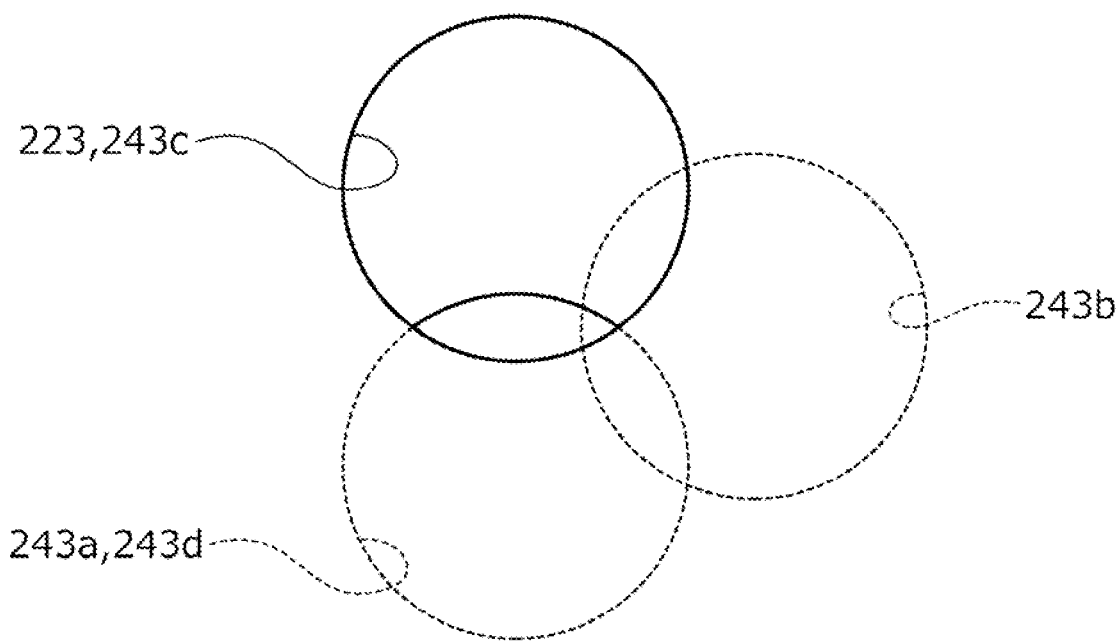

In addition, a dimple 223 and hollow portions 243a to 243d may be spirally disposed toward the thickness direction as illustrated in FIG. 9 although a mode in which the dimple 22 and the hollow portions 24b and 24d in the recessed unit 25A are disposed so as to overlap when viewed from the direction orthogonal to the sliding surface 21 and the hollow portions 24a and 24c overlap when viewed from the direction orthogonal to the sliding surface 21 and are disposed so as to be misaligned to the inner diameter side of the dimple 22 and the hollow portions 24b and 24d has been exemplified in the first embodiment. Specifically, the dimple 223 and the hollow portion 243c may overlap when viewed from the direction orthogonal to the sliding surface 21, the hollow portions 243a and 243d may overlap when viewed from the direction orthogonal to the sliding surface 21 at positions out of alignment with the dimple 223 and the hollow portion 243c in the radial direction, and the hollow portion 243b may be disposed at a position out of alignment with the dimple 223 and the hollow portions 243a, 243c, and 243d in the radial direction when viewed from the direction orthogonal to the sliding surface 21.

In addition, the recessed unit 25A and the recessed unit 25B may be disposed at the same positions in the thickness direction although a mode in which the recessed unit 25A and the recessed unit 25B are disposed out of alignment in the thickness direction of the mating ring 20 has been exemplified in the first embodiment. Even in this case, the recessed units 25A and 25B respectively communicate in the thickness direction, and thus a state where the dimple group is not formed in the region of use of the mating ring 20 can be avoided. In other words, a dimple group may be formed that has a volume within a predetermined range at which the sealed fluid can be appropriately held with the sliding surfaces 11 and 21 appropriately separated from each other in the region of use of the mating ring 20.

Second Embodiment

Next, the sliding component according to the second embodiment of the present invention will be described with reference to FIG. 10. It should be noted that description of configurations identical to those of the first embodiment is omitted for redundancy avoidance. It should be noted that only the mode of the row 23A will be described here.

Figure 10A:
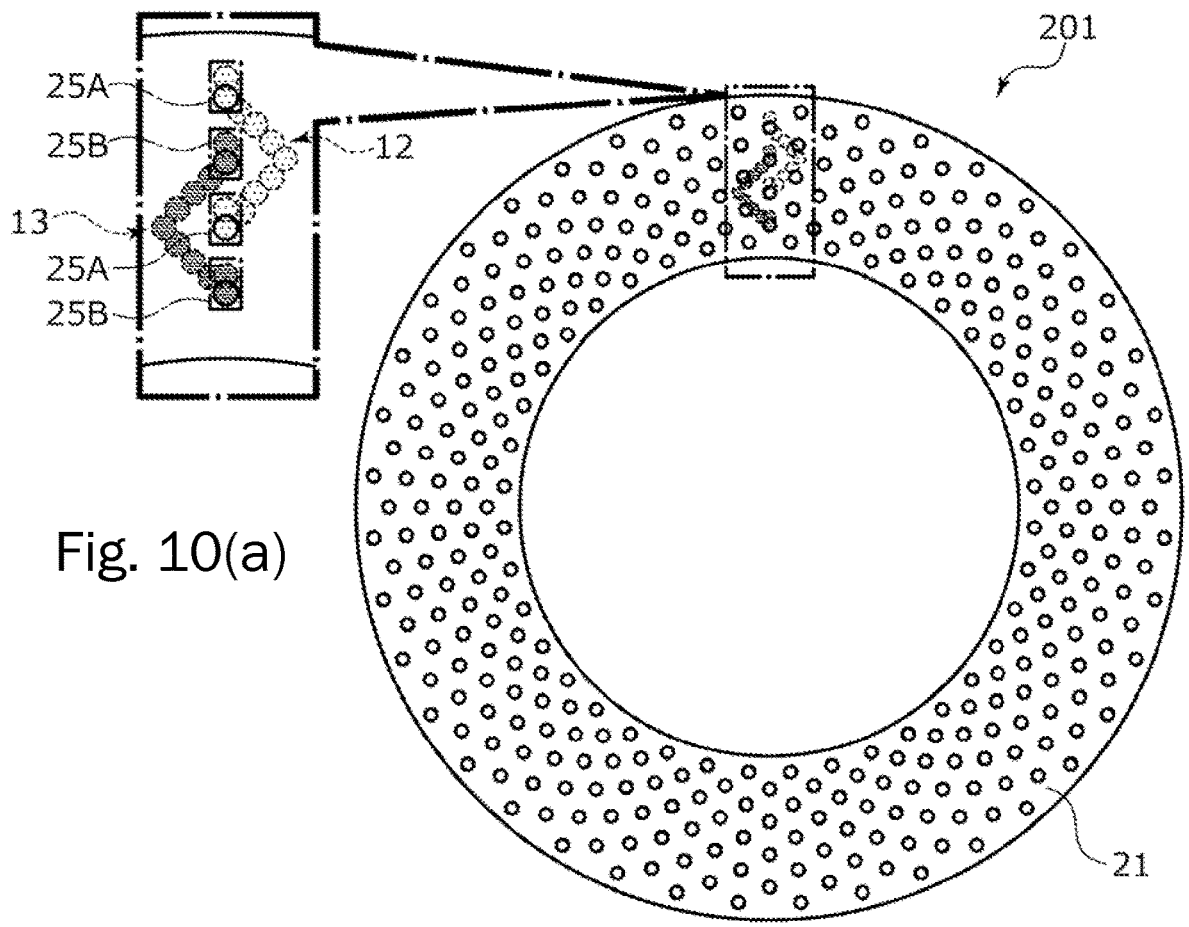
FIG. 10A is a plan view illustrating a sliding surface of a mating ring according to a second embodiment of the present invention.
Figure 10B:
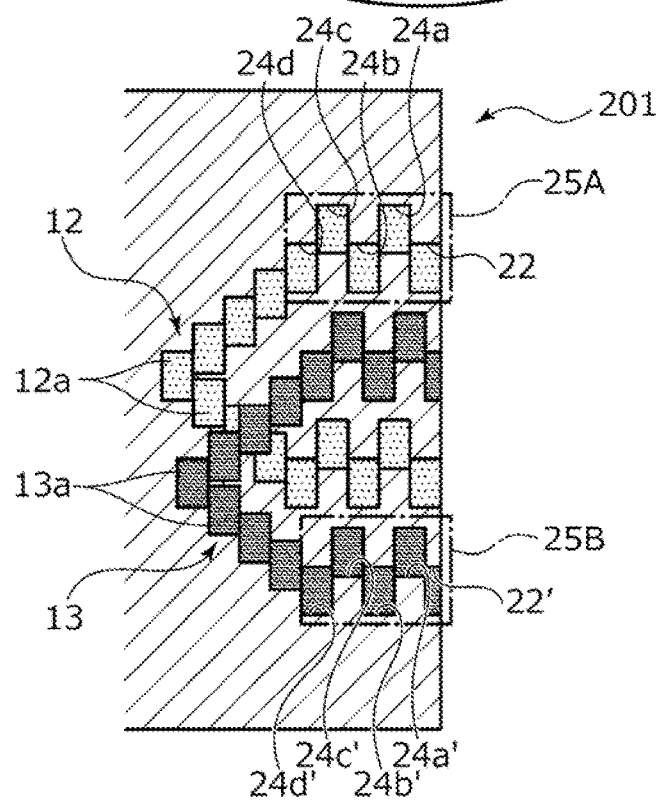
FIG. 10B is a schematic cross-sectional view of FIG. 10A.

As illustrated in FIG. 10A, in the row 23A of a mating ring 201 partially forming a sliding component according to the second embodiment of the present invention, a communication passage 12 allows the recessed units 25A to communicate with each other and a communication passage 13 allows the recessed units 25B to communicate with each other.

The communication passage 12 allows the hollow portions 24d disposed in the deepest portions of the recessed units 25A to communicate with each other. The communication passage 12 is formed by a plurality of hollow portions 12a being connected in a V-shaped cross section. In addition, the communication passage 13 allows the hollow portions 24d' disposed in the deepest portions of the recessed units 25B to communicate with each other. The communication passage 13 is formed by a plurality of hollow portions 13a being connected in a V-shaped cross section. According to this, a large amount of sealed fluid can be held in the communication passages 12 and 13 and the wear debris on the sliding surface 21 can be discharged to the communication passages 12 and 13. Accordingly, wear debris accumulation in the dimples 22 and 22' can be suppressed.

Figure 11A:
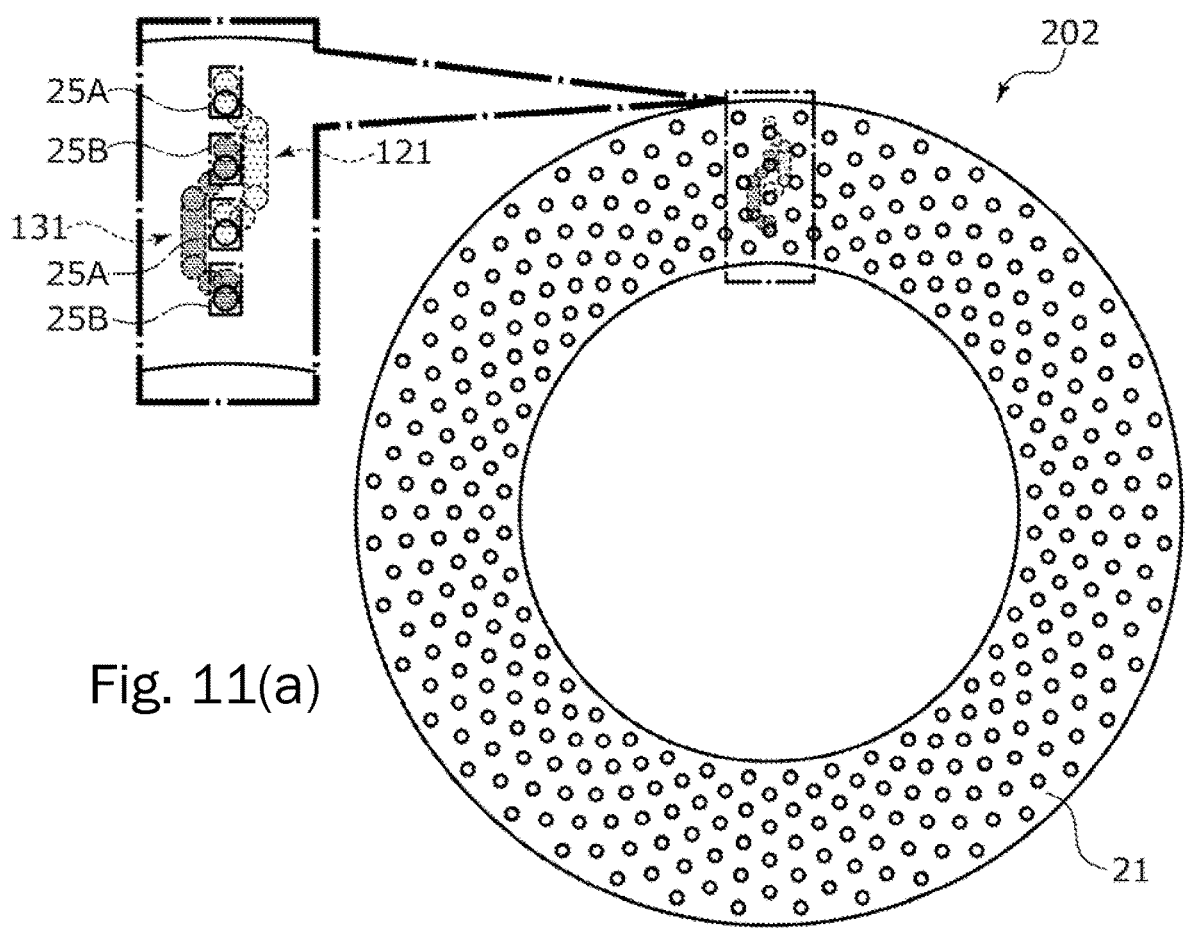
FIGS. 11A and 11B are views illustrating a first modification example of a sliding component according to the second embodiment of the present invention.
Figure 11B:
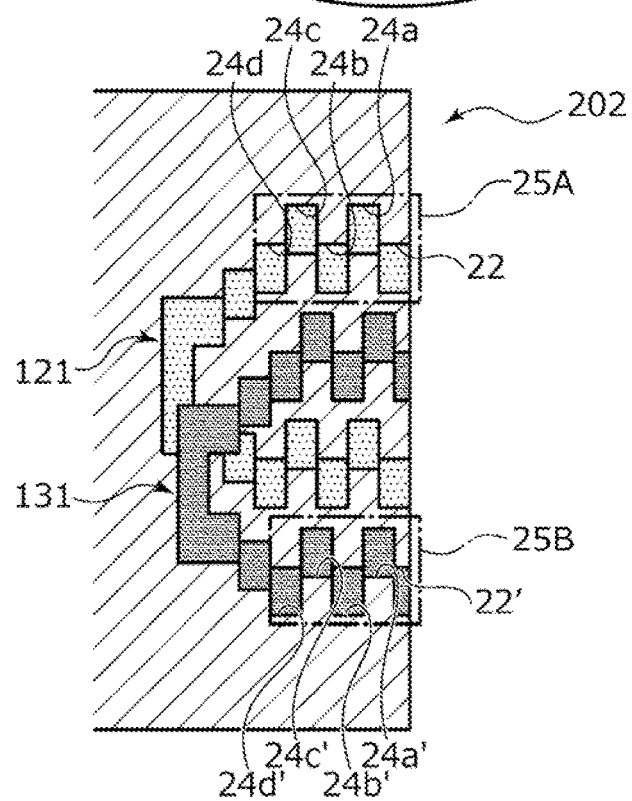

Next, a first modification example of the sliding component according to the second embodiment will be described. As illustrated in FIG. 11, the deepest portions of communication passages 121 and 131 extend in the radial direction so as to be orthogonal to the axial direction (thickness direction) of a mating ring 202 and have a U-shaped cross section. In this manner, the shapes of the communication passages 121 and 131 can be freely changed.

Figure 12A:
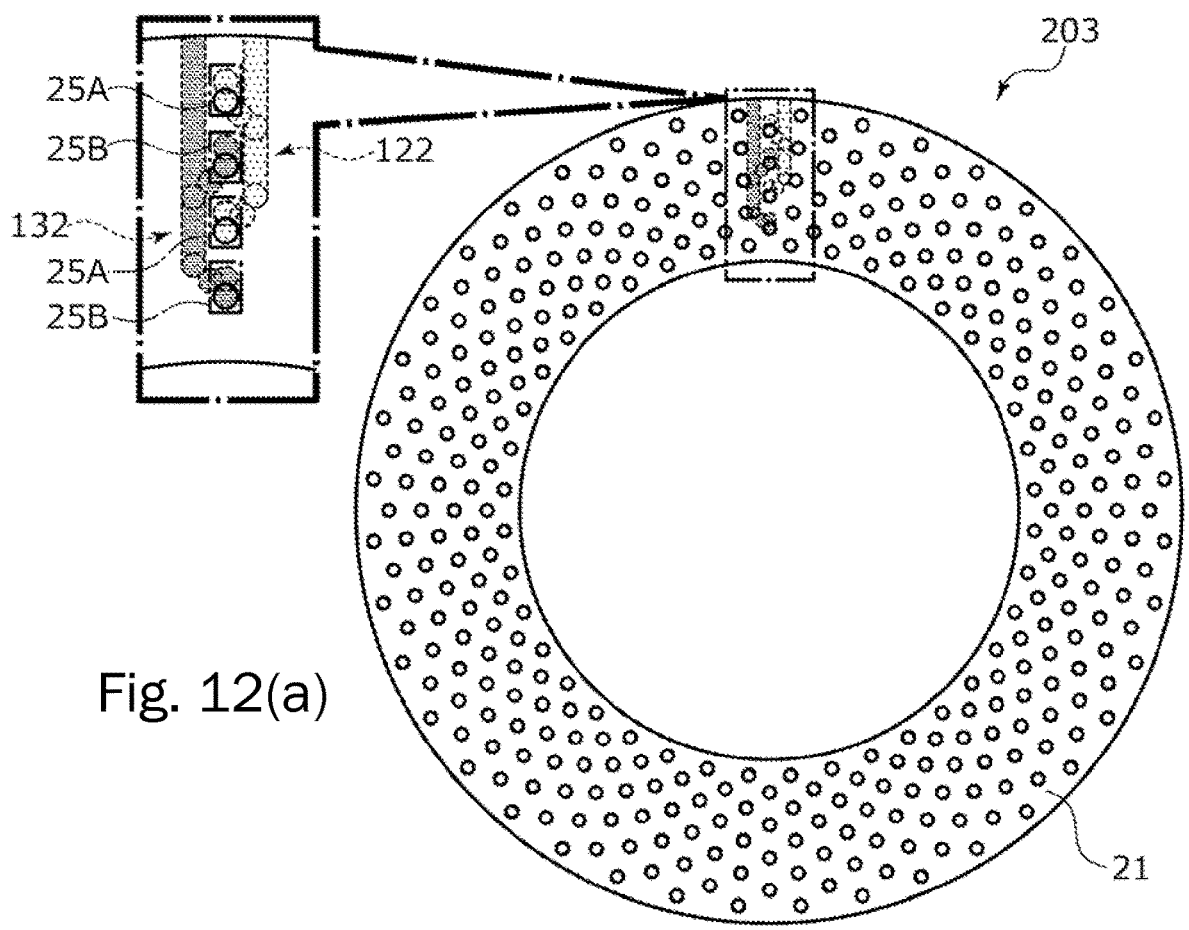
FIGS. 12A and 12B are views illustrating a second modification example of the sliding component according to the second embodiment of the present invention.
Figure 12B:
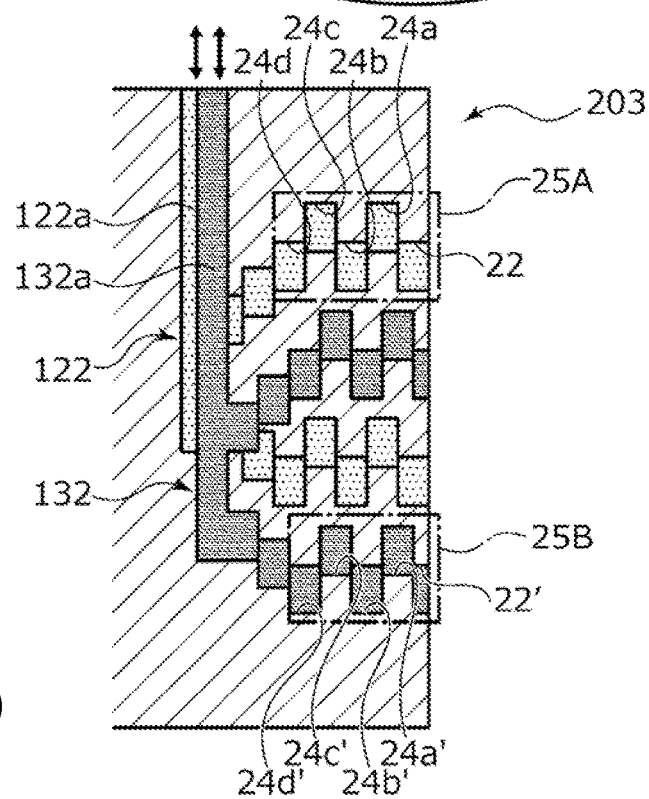

Next, a second modification example of the sliding component according to the second embodiment will be described. As illustrated in FIG. 12, communication passages 122 and 132 have communication groove portions 122a and 132a extending from the deepest portions of the communication passages 122 and 132 to the outer diameter side of a mating ring 203. According to this, the sealed fluid can be drawn into the communication passages 122 and 132 through the communication groove portions 122a and 132a and the wear debris on the sliding surface 21 can be discharged to the sealed fluid side through the communication groove portions 122a and 132a. The drawing and discharging of the sealed fluid through the communication groove portions 122a and 132a change depending on the depth of the dimple appearing on the sliding surface 21.

Third Embodiment

Next, the sliding component according to the third embodiment of the present invention will be described with reference to FIGS. 13 and 14. It should be noted that description of configurations identical to those of the first embodiment is omitted for redundancy avoidance.

Figure 13:
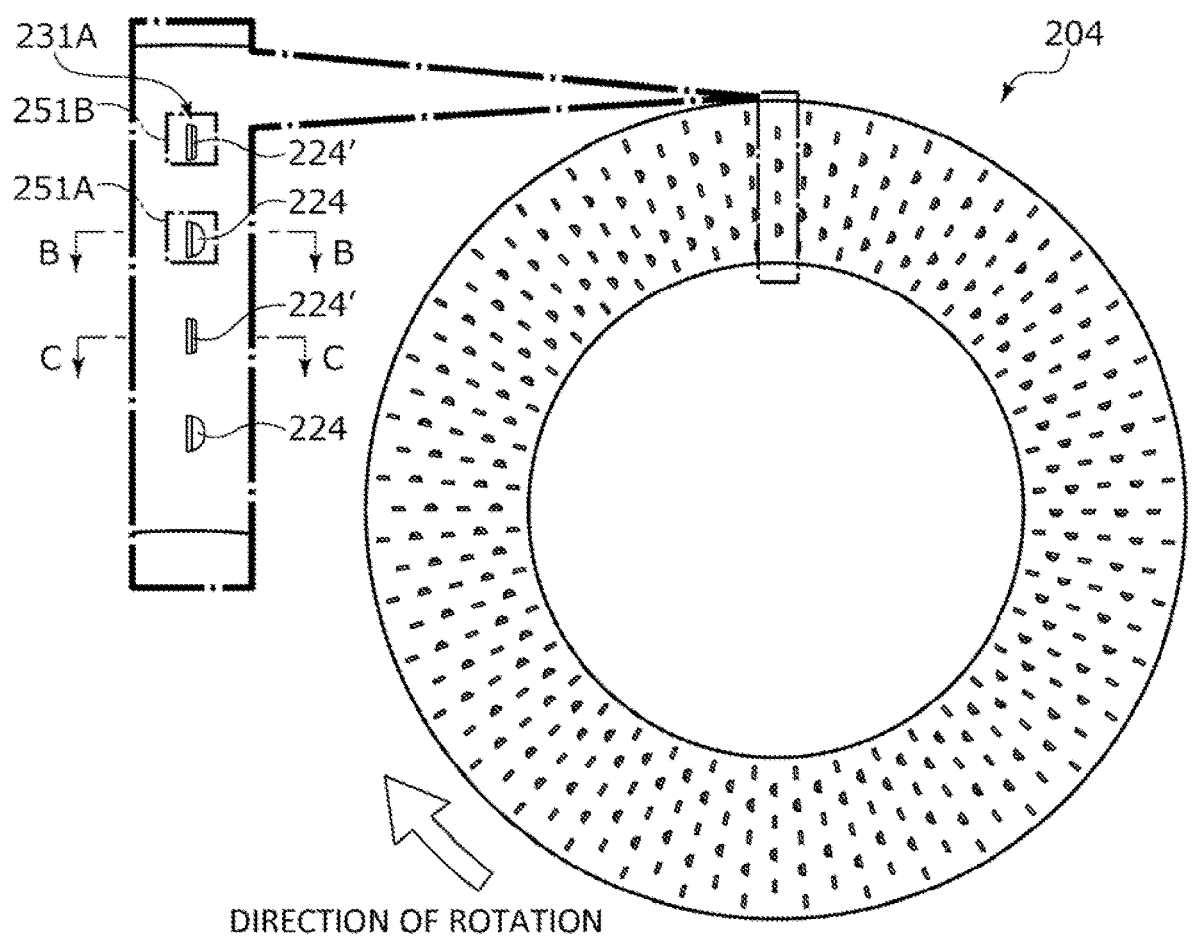
FIG. 13 is a plan view illustrating a sliding surface of a mating ring according to a third embodiment of the present invention.
Figure 14A:
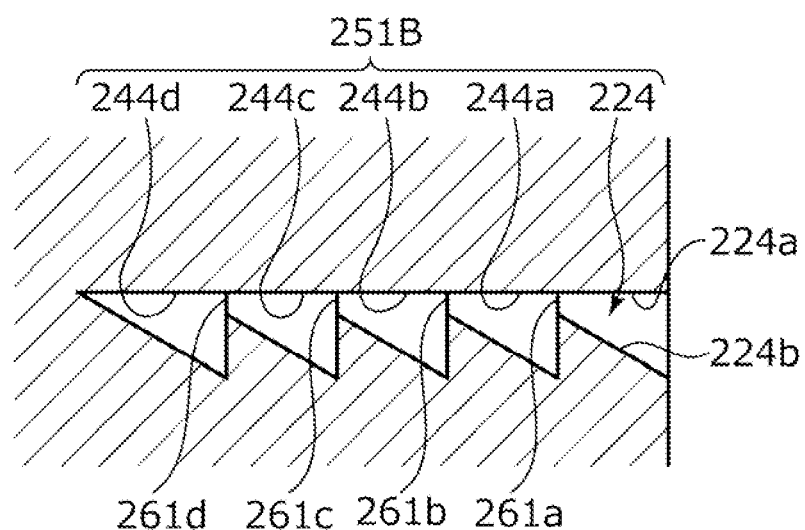
FIG. 14A is a cross-sectional view taken along line B-B.
Figure 14B:
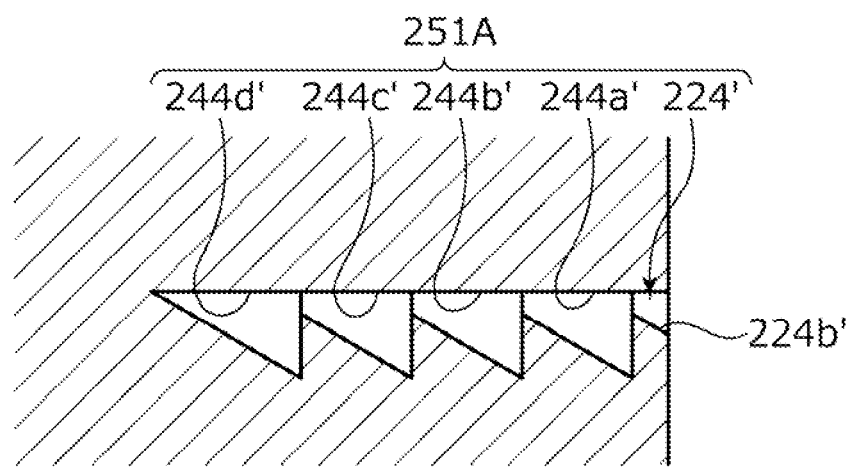
FIG. 14B is a cross-sectional view taken along line C-C.

As illustrated in FIGS. 13 and 14, a row 231A of a mating ring 204 is configured by dimples 224 and 224' of recessed units 251A and 251B disposed out of alignment in the thickness direction being alternately disposed in the radial direction.

The dimple 224 of the recessed unit 251A has an opening portion formed in a semicircular shape when viewed from the direction orthogonal to the sliding surface 21. A wall portion 224a on the side opposite to the turning direction of the mating ring 203 (see the white arrow in FIG. 13) is formed so as to extend in the thickness direction so as to be orthogonal to the direction of rotation. A curved wall portion 224b on the turning direction side is formed in a tapered shape that tapers toward the thickness direction.

In addition, hollow portions 244a to 244d have the same shape as the dimple 224 and are disposed so as to overlap in the thickness direction. In other words, the dimple 224 and the hollow portions 244a to 244d are respectively tapered toward the thickness direction, and thus the overlapping parts of the dimple 224 and the hollow portions 244a to 244d are throttle flow paths 261a to 261d.

In addition, the dimple 224' of the recessed unit 251B is formed so as to be shallower in depth dimension than the dimple 224 and hollow portions 244a' to 244d' have the same shape as the dimple 224 and the hollow portions 244a to 244d.

According to this, the sealed fluid is capable of flowing in smoothly from the wall portion 224b and 224b' sides of the dimples 224 and 224' along the tapered shape, and thus a dynamic pressure generation effect can be enhanced. In addition, the dimple 224 and the hollow portions 244a to 244d are linearly disposed in the plate thickness direction, and thus multiple recessed units 251A and 251B can be disposed with efficiency.

Figure 15:
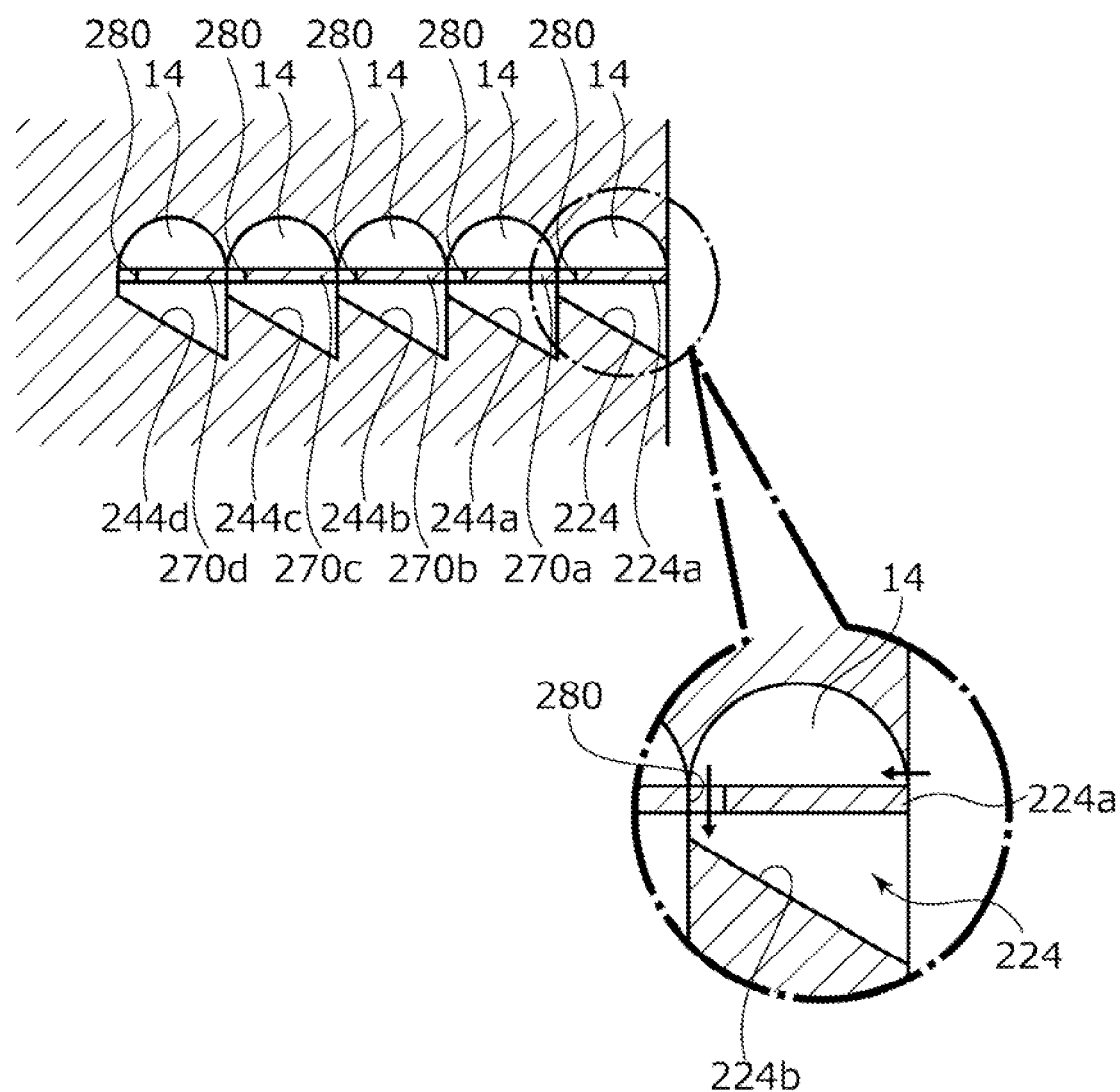
FIG. 15 is a view illustrating a modification example of a sliding component according to the third embodiment of the present invention.

In addition, the following is a modification example of the sliding component of the third embodiment. As illustrated in FIG. 15, a hemispherical liquid holding portion 14 is formed across the wall portion 224a on the side opposite to the dimple 224 in the turning direction. In addition, the liquid holding portions 14 are also formed on the sides opposite to the hollow portions 244a to 244d in the direction of rotation across wall portions 270a to 270d of the hollow portions 244a to 244d. Through holes 280 are respectively formed in the wall portion 224a and the wall portions 270a to 270d. As a result, the dimple 224 communicates with the liquid holding portion 14 and the wall portions 270a to 270d respectively communicate with the liquid holding portions 14.

According to this, the sealed fluid can be held in the liquid holding portion 14 when the sliding surface 21 is worn and the liquid holding portion 14 is open. In addition, the sealed fluid is capable of flowing in through the through hole 280 to the dimple 224 side. Accordingly, the sealed fluid holding capacity of the dimple 224 is improved.

Although embodiments of the present invention have been described above with reference to the drawings, the specific configurations are not limited to the embodiments and any changes or additions within the scope of the present invention are included in the present invention.

For example, although the mechanical seal for general industrial machinery has been described as an example of the sliding component in the above embodiments, the mechanical seal may be replaced with another mechanical seal for an automobile, a water pump, or the like. In addition, the mechanical seal may be an outside-type mechanical seal.

In addition, although an example in which the dimple and the hollow portion are provided only in the mating ring has been described in the above embodiments, the dimple and the hollow portion may be provided only in the seal ring or may be provided in both the seal ring and the mating ring.

In addition, the generated dynamic pressure increases when the dimples are too large in number and the change in the dynamic pressure acting over the circumferential direction of the sliding surface increases when the dimples are too small in number. Accordingly, it is preferable to appropriately set the number in accordance with the environment of use and so on.

In addition, although the mechanical seal has been described as an example of the sliding component, the sliding component may be a non-mechanical seal sliding component such as a slide bearing.

In addition, although a mode in which a sliding member is formed using a 3D printer as an additive manufacturing device ejecting and depositing a material has been exemplified in the above embodiments, the additive manufacturing method is not limited thereto. For example, a sliding member having a plurality of hollow portions in the thickness direction may be formed by laminating and connecting uneven plate material using a sheet lamination device.

In addition, although a mode in which the depths of the recessed portions constituting the group of recessed portions are divided into two types (e.g., dimples 22 and 22') has been exemplified in the above embodiments, the group of recessed portions may be configured by recessed portions having three or more types of depths. According to this, the allowable fluctuation range of the volume of the group of recessed portions can be narrowed. It should be noted that the hollow portions may be configured in different shapes although a mode in which the hollow portions have the same shape has been exemplified.

REFERENCE SIGNS LIST

10 Seal ring (the other of sliding members)
11 Sliding surface
20 Mating ring (one of sliding members)
20A Base material
20B Base member
21 Sliding surface
22, 22' Dimple (recessed portion)
22A Dimple group (group of recessed portions)
24a to 24d Hollow portion
25A, 25B Recessed unit
26a to 26d Passage (throttle passage)
201 to 204 Mating ring (one of sliding members)
221 to 224 Dimple (recessed portion)
M SiC powder (predetermined material)

The invention claimed is:

1. A sliding component comprising a pair of sliding members, at least one of the sliding members being provided with:
   a group of recessed portions including a plurality of recessed portions formed in a sliding surface of the one of the sliding members; and
   a plurality of hollow portions formed inside the one of sliding members so as to be out of alignment with the recessed portions in a thickness direction of the one of the sliding members, and
   the hollow portions are disposed so as to generate at least part of a new group of recessed portions until the one of the sliding members is worn by a thickness of deepest one of the recessed portions.

2. The sliding component according to claim 1, wherein a range of fluctuation of the volume of the group of recessed portions formed in the sliding surface is within 20% while the one of the sliding members is worn by the thickness of the deepest recessed portion of the group of recessed portions.

3. The sliding component according to claim 2, wherein the hollow portions are disposed so as to overlap the recessed portions in part or in whole in a view from a direction orthogonal to the sliding surface.

4. The sliding component according to claim 1, wherein the hollow portions are disposed so as to overlap the recessed portions in part or in whole in a view from a direction orthogonal to the sliding surface.

5. The sliding component according to claim 1, wherein the recessed portions of the group of recessed portions have different depths.

6. The sliding component according to claim 1, wherein throttle passages extending in the thickness direction allow the recessed portions and the hollow portions to communicate with each other.

7. The sliding component according to claim 6, wherein the throttle passages are formed at partially overlapping portions of the recessed portions and the hollow portions.

8. The sliding component according to claim 1, wherein the hollow portions are equal to each other in shape.

9. The sliding component according to claim 1, wherein each of the hollow portions has at least a flat surface.

10. The sliding component according to claim 1, wherein a base material of the one of the sliding members between adjoining two of the recessed portions continuously extends in the thickness direction from the sliding surface to a surface on a side opposite to the sliding surface.

11. A sliding component comprising a pair of sliding members, at least one of the sliding members being provided with:
   recessed portions formed in a sliding surface of the one of the sliding members, each of the recessed portions having a flat surface; and hollow portions formed inside the one of the sliding members so as to be disposed at a position deeper than the recessed portions, wherein a base material forming the sliding member exists between the hollow portion and the sliding surface in an axial direction, and the sliding member is provided with a throttle passage communicating the recessed portions with the hollow portion.

12. The sliding component according to claim 11, wherein the hollow portions are positioned out of alignment with the recessed portions in a circumferential direction or a radial direction.

13. The sliding component according to claim 12, wherein the flat surfaces of the recessed portions are bottom surfaces of the recessed portions and the flat surfaces of the hollow portions are bottom surfaces of the hollow portions.

14. The sliding component according to claim 11, wherein the flat surfaces of the recessed portions are bottom surfaces of the recessed portions and the flat surfaces of the hollow portions are bottom surfaces of the hollow portions.

15. The sliding component according to claim 14, wherein the hollow portions are positioned out of alignment in a circumferential direction or a radial direction in a state in which the hollow portions partially overlap bottom surfaces of the recessed portions in an axial direction and the hollow portions are continuously provided so as to communicate with the recessed portions at points overlapping the bottom surfaces of the recessed portions in the axial direction.

16. A method of a sliding member provided with a group of recessed portions including a plurality of recessed portions formed in a sliding surface of the sliding member, and having a recessed shape in a cross-sectional view and a plurality of hollow portions formed inside the sliding member, the hollow portions being disposed so as to generate at least part of a new group of recessed portions until the sliding member is worn by a thickness of deepest one of the recessed portions, the method comprising steps of:

laminating layers made of base material and each having holes; and coupling the layers together.

17. The method of manufacturing the sliding member according to claim 16, further comprising a step of forming throttle passage communicating the recessed portions and the hollow portions in a thickness direction of the sliding member.

18. The method of manufacturing the sliding member according to claim 17, wherein the laminating step and the coupling step are carried out by an additive manufacturing device.

19. The method of manufacturing the sliding member according to claim 16, wherein the laminating step and the coupling step are carried out by an additive manufacturing device.

20. The method of manufacturing the sliding member according to claim 16, wherein, in the laminating step and the coupling step, the layers are laminated on a base member and integrated with the base member.

* * * * *